(12) United States Patent
Perkins et al.

(10) Patent No.: US 12,491,420 B2
(45) Date of Patent: Dec. 9, 2025

(54) MODULAR SENSOR-BASED DISC SPORTS DEVICE THAT PROVIDES ANALYSIS OF DISC THROWS

(71) Applicant: Disc Sense LLC, Denver, CO (US)

(72) Inventors: Lucas Robert Perkins, Denver, CO (US); Devin Benson, Aurora, CO (US); Joshua Pickrell, Arvada, CO (US)

(73) Assignee: Disc Sense LLC, Denver, CO (US)

( * ) Notice: Subject to any disclaimer, the term of this patent is extended or adjusted under 35 U.S.C. 154(b) by 0 days.

(21) Appl. No.: 18/807,392

(22) Filed: Aug. 16, 2024

(65) Prior Publication Data

US 2025/0058192 A1 Feb. 20, 2025

Related U.S. Application Data

(60) Provisional application No. 63/533,600, filed on Aug. 18, 2023.

(51) Int. Cl.
*A63B 65/10* (2006.01)
*A63B 24/00* (2006.01)
*A63B 67/06* (2006.01)

(52) U.S. Cl.
CPC .......... *A63B 65/10* (2013.01); *A63B 24/0021* (2013.01); *A63B 67/06* (2013.01); *A63B 2024/0034* (2013.01); *A63B 2209/08* (2013.01); *A63B 2209/10* (2013.01); *A63B 2220/12* (2013.01); *A63B 2220/40* (2013.01); *A63B 2220/833* (2013.01); *A63B 2225/50* (2013.01)

(58) Field of Classification Search
None
See application file for complete search history.

(56) References Cited

U.S. PATENT DOCUMENTS

| | | | |
|---|---|---|---|
| 3,786,246 A | 1/1974 | Johnson et al. | |
| 4,568,297 A | 2/1986 | Dunipace | |
| 7,294,036 B2 | 11/2007 | Potts | |
| 8,157,607 B2 | 4/2012 | Cowles et al. | |
| 9,320,981 B2 | 4/2016 | Dawson | |

(Continued)

FOREIGN PATENT DOCUMENTS

| | | |
|---|---|---|
| CA | 122688 A | 9/1987 |
| GB | 2410905 A | 7/2008 |

(Continued)

*Primary Examiner* — Stephen T. Reed
(74) *Attorney, Agent, or Firm* — Aleksandar Nikolic

(57) ABSTRACT

A disc sports device for attachment to a throwing disc having a circular housing, having a first side opposite a second side connected by a sidewall therebetween, forming a cavity having a printed circuit board assembly within, and a midline axis passing through the center of the first side, the center of the PCBA, and the center of the second side. The PCBA has a processor, a memory, a first accelerometer centered on the midline axis, a second accelerometer offset from the first accelerometer, a GPS module, a magnetometer, a gyroscope, and at least one wireless communication module, and a battery. The disc sports device has a connecting ring having a first connector side opposite a second connector side and a central opening therebetween, the first connector side having a disc connector and the second connector side having a housing connector detachably connected to the housing.

19 Claims, 15 Drawing Sheets

(56) References Cited

U.S. PATENT DOCUMENTS

| | | |
|---|---|---|
| 9,579,552 B2 | 2/2017 | Martin et al. |
| 10,328,357 B2 | 6/2019 | Tarng |
| 10,602,929 B1 | 3/2020 | McKay |
| 11,273,354 B2 | 3/2022 | Redgård et al. |
| 2006/0199682 A1 | 9/2006 | Holms |
| 2009/0004945 A1 | 1/2009 | deLassus |
| 2011/0053716 A1 | 3/2011 | Lewis |
| 2011/0250819 A1 | 10/2011 | Tashman |
| 2013/0303314 A1 | 11/2013 | Tackett |
| 2015/0319562 A1* | 11/2015 | Martin .................... H04W 4/80 473/588 |
| 2017/0007881 A1 | 1/2017 | Penttila |
| 2018/0021630 A1* | 1/2018 | Monnin ................ A63F 13/235 473/570 |
| 2018/0200582 A1* | 7/2018 | Thurman ........... G09B 19/0038 |

FOREIGN PATENT DOCUMENTS

| | | |
|---|---|---|
| KR | 20180120940 A | 11/2018 |
| KR | 20200057570 A | 5/2020 |

\* cited by examiner

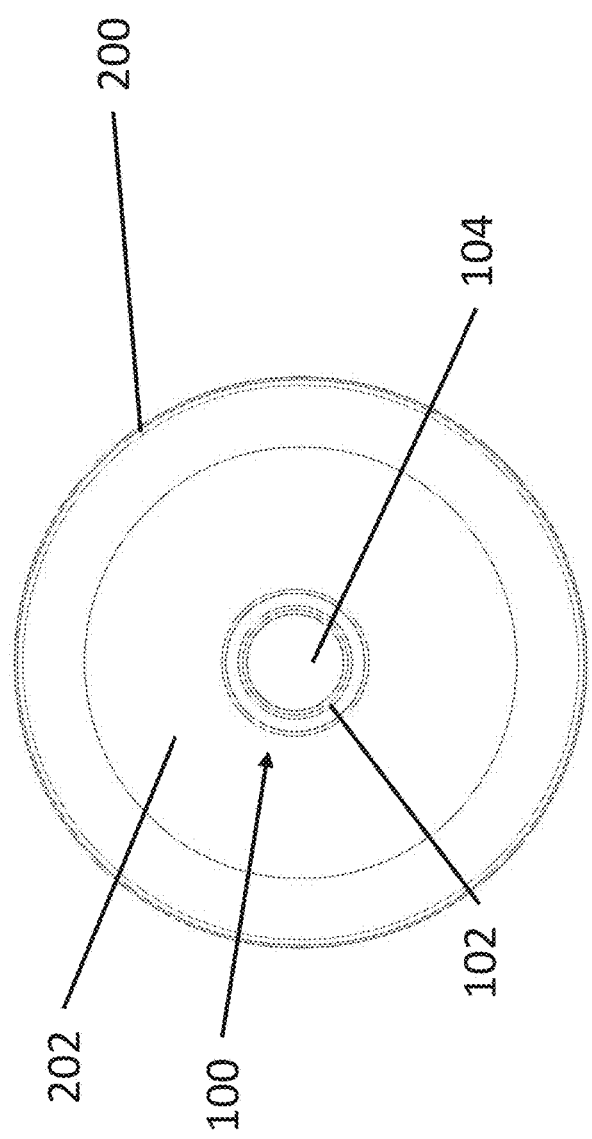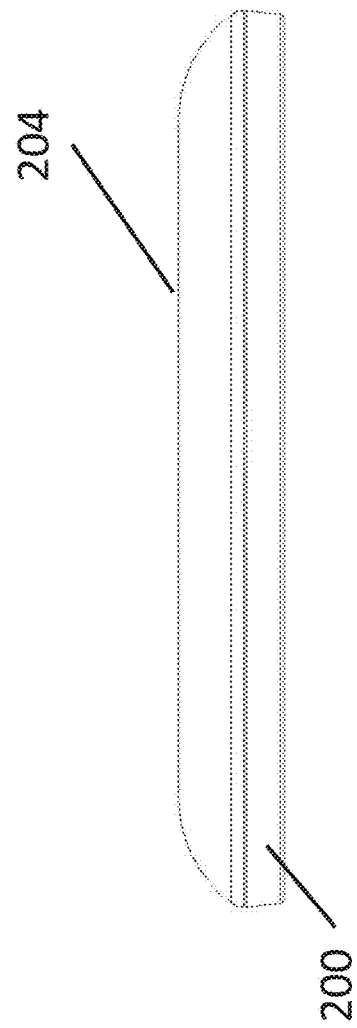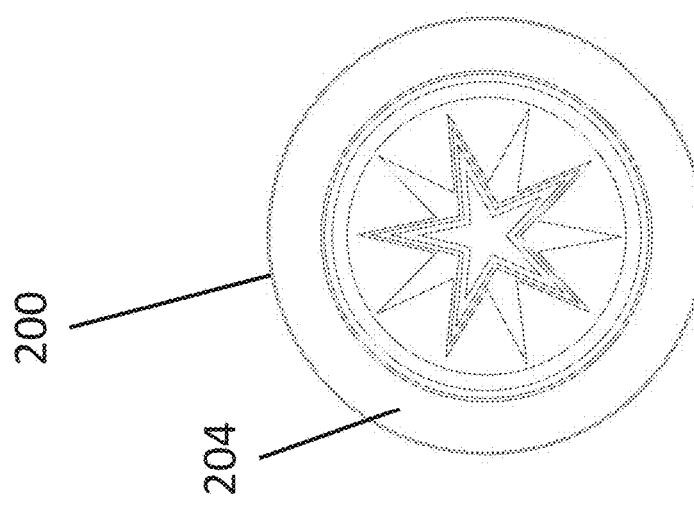

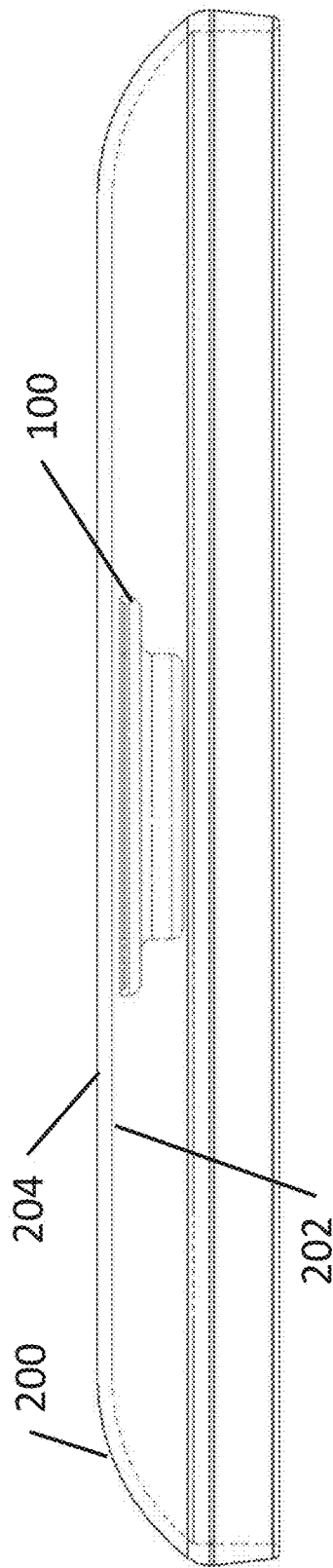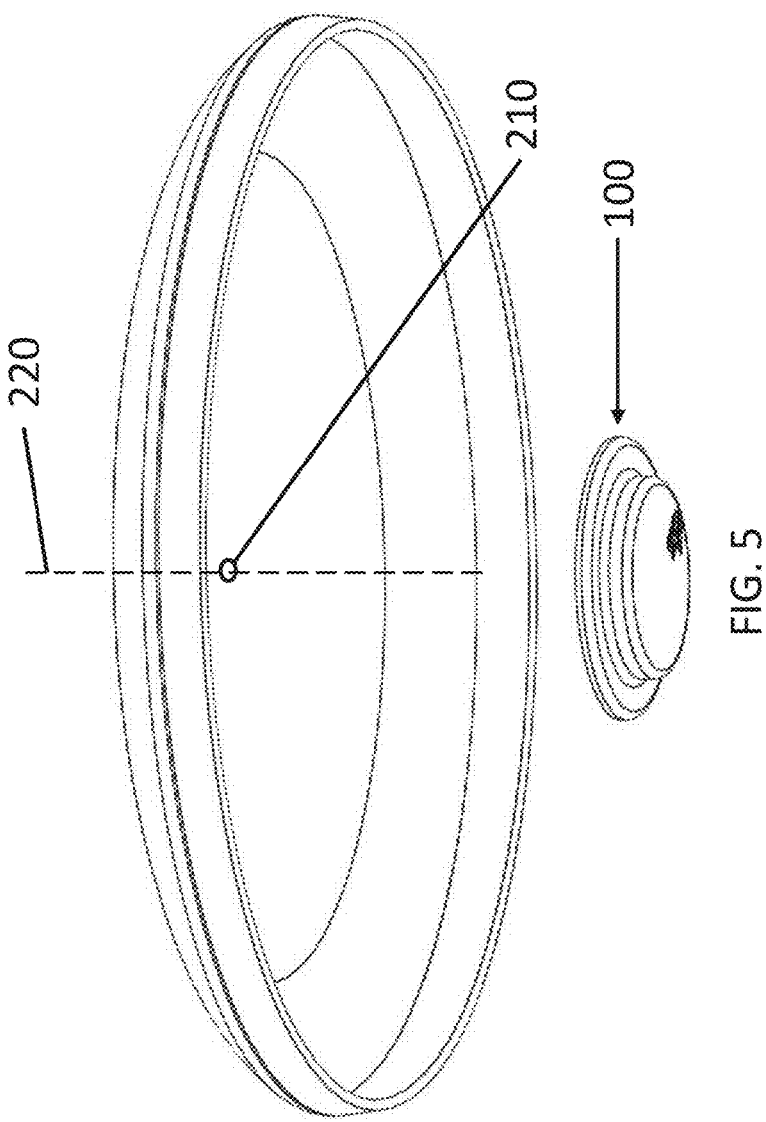

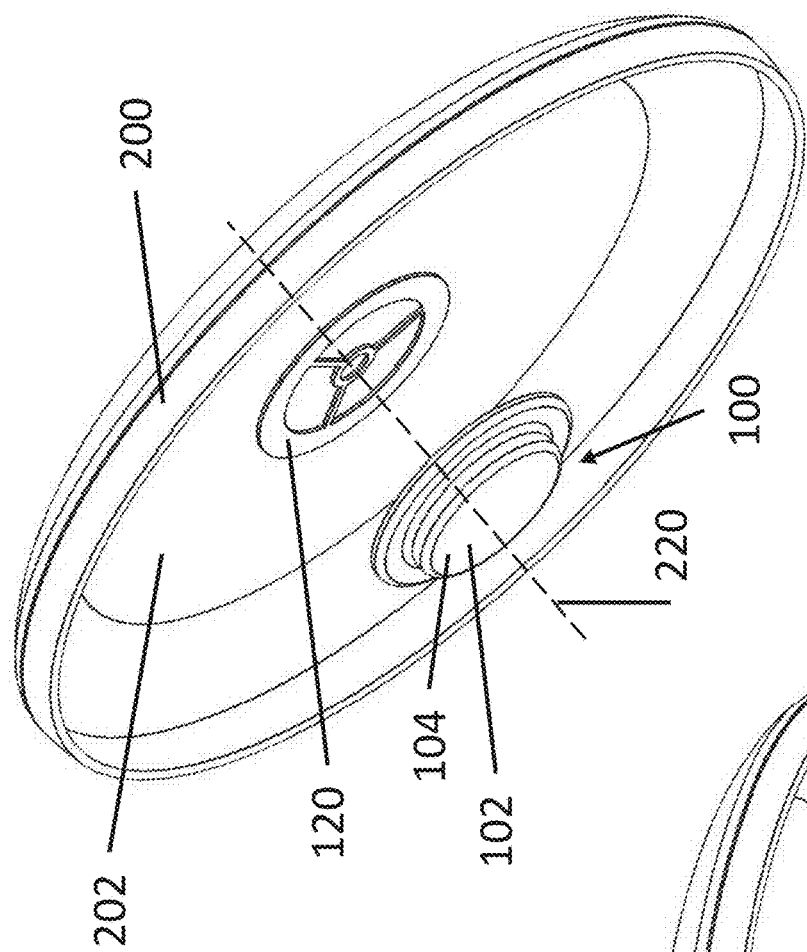
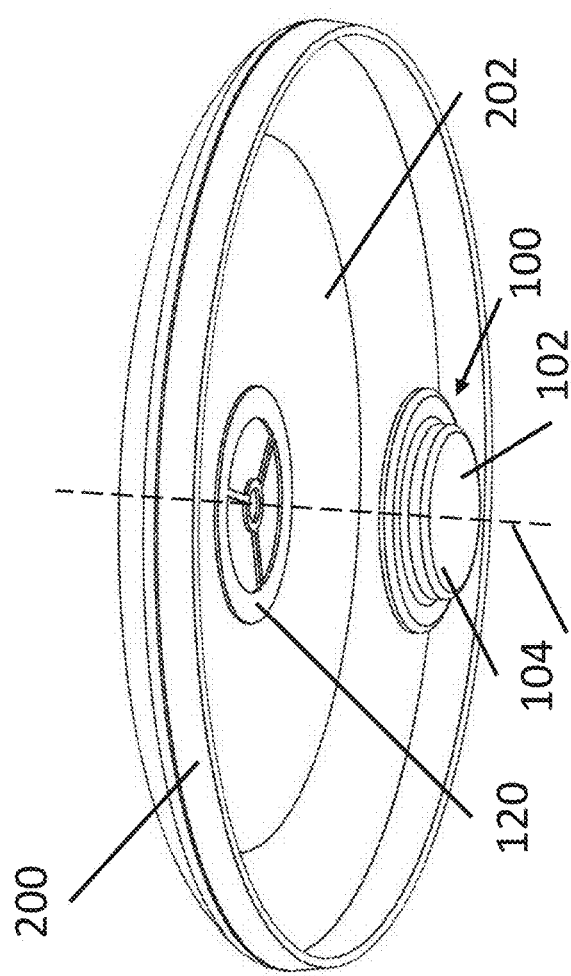
FIG. 6
FIG. 7

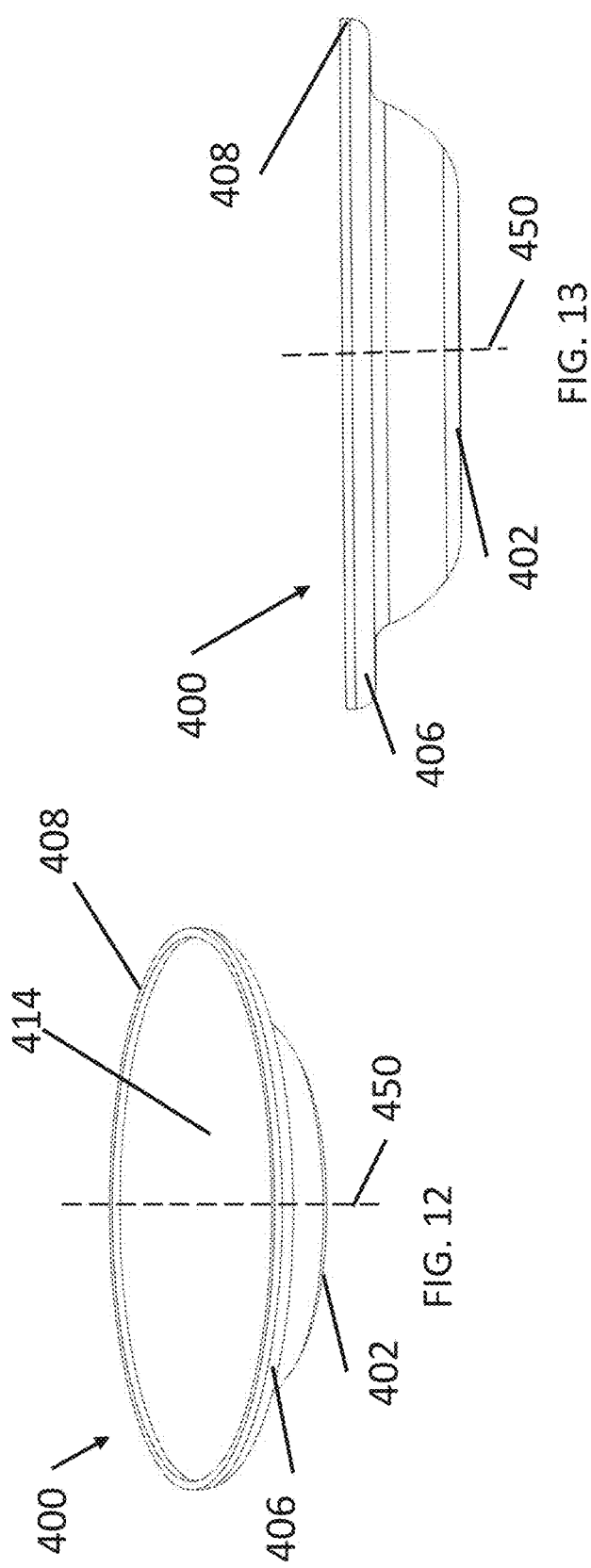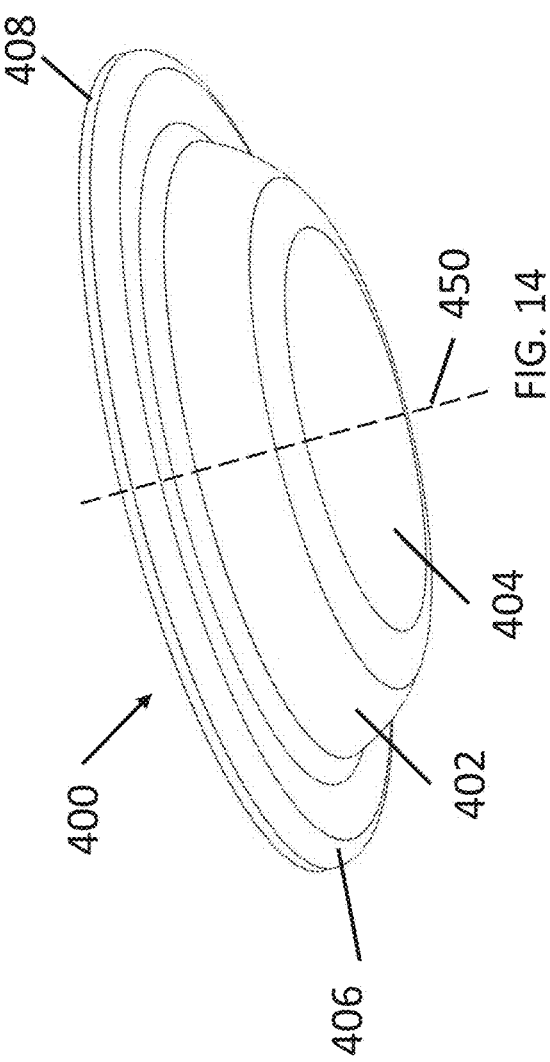

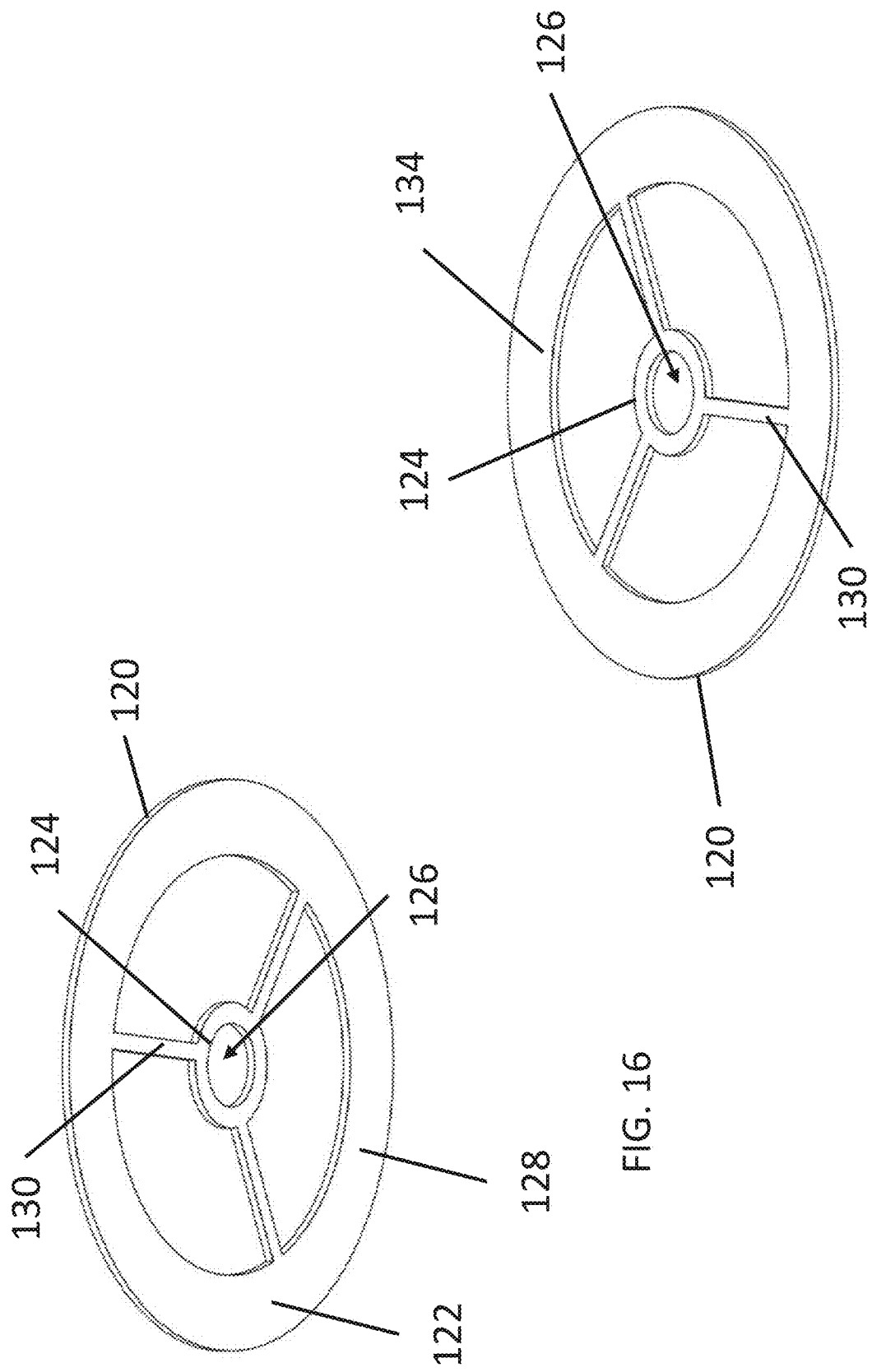

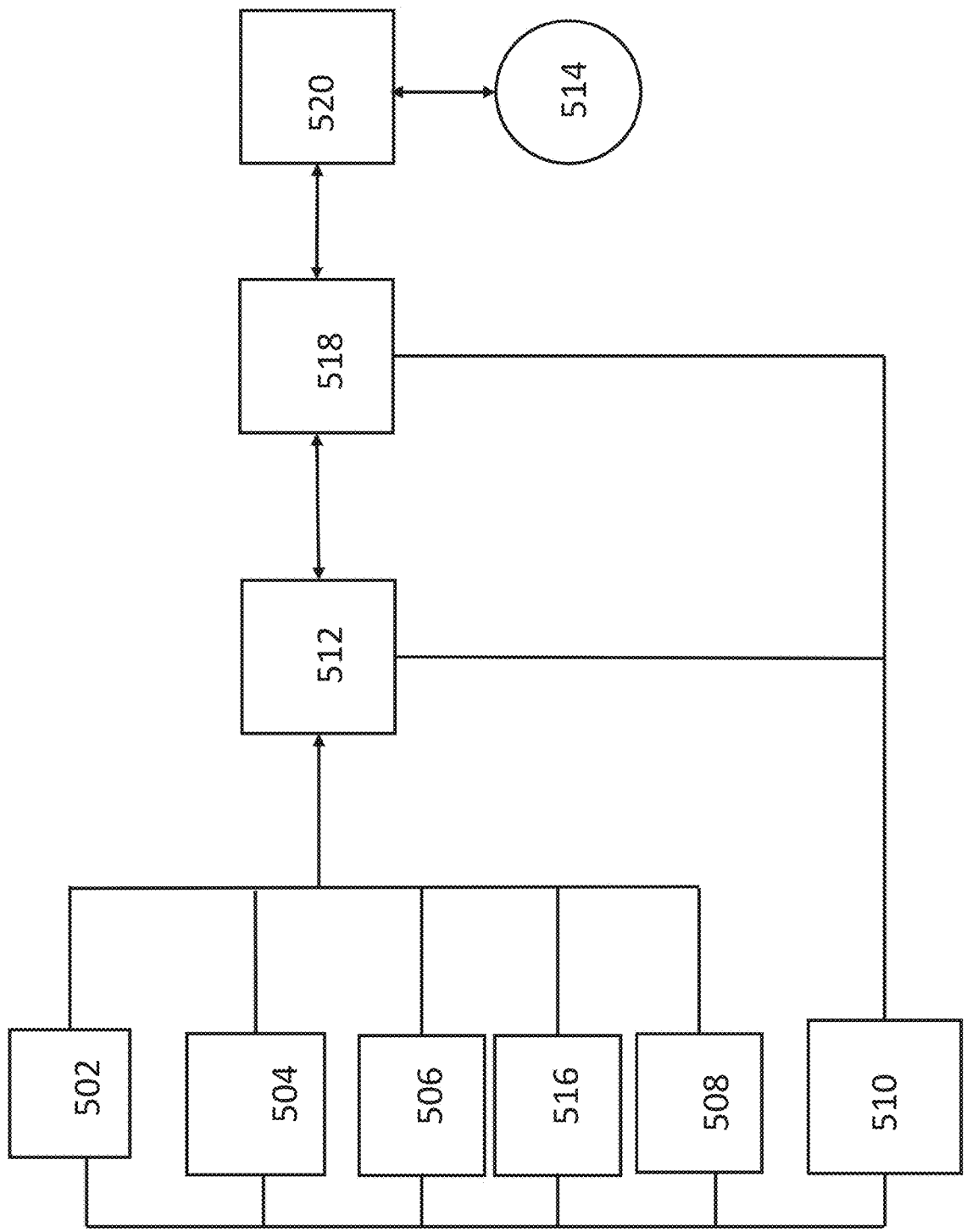

MODULAR SENSOR-BASED DISC SPORTS DEVICE THAT PROVIDES ANALYSIS OF DISC THROWS

CROSS-REFERENCE TO RELATED APPLICATIONS

This application claims priority under 35 U.S.C. § 119 to U.S. Provisional Application No. 63/533,600, filed Aug. 18, 2023, which is herein incorporated by reference in its entirety.

BACKGROUND OF THE INVENTION

Technical Field

This invention is generally related to devices, systems, and methods for gathering sports metrics, and in particular modular and transferable, sensor-based devices, systems, and methods that provide analysis of disc throws.

Background Information

Throwing a disc is a vital skill for disc sports such as Ultimate and Disc Golf, however, it is an extremely difficult skill to master. Currently, players work with coaches and teammates to assess their throwing technique and then try to apply that coaching to improve their form. As a result, players either need to find an expert to provide coaching or need to try to learn to improve their throws on their own without feedback.

While there are some existing devices capable of measuring certain metrics, the sensors for these existing devices are commonly integrated, encapsulated, or otherwise manufactured within a molded disc. This renders the existing devices incapable of application to other discs. Yet, many disc athletes like to practice or play disc sports with a variety of different discs. The existing devices prevent such disc athletes from being able to get sensor-based feedback with all of the discs they may choose to use.

Therefore, what is needed is a modular and transferable device that can be attached to and detached from any type of disc, and which captures sensor-based data of disc throws and provides useful analysis of the sensor-based data in a visual format that is easily accessible to a user.

SUMMARY OF THE INVENTION

The present disclosure is directed toward modular and transferable, sensor-based devices, systems, and methods that provide analysis of disc throws.

In one aspect of the present disclosure provided herein, is a disc sports device for attachment to a throwing disc having a circular housing, having a first side opposite a second side connected by a sidewall between, forming a cavity having a printed circuit board assembly ("PCBA") within, and a midline axis passing through the center of the first side, the center of the PCBA, and the center of the second side. The PCBA has a processor, a memory, a first accelerometer centered on the midline axis, a second accelerometer offset from the first accelerometer, a magnetometer, a GPS module, a gyroscope, at least one wireless communication module, and a battery. The battery is wired to provide power to the PCBA; and the processor is in data communication with the memory, the first accelerometer, the gyroscope, the second accelerometer, the magnetometer, the GPS module, the wireless communications module. The disc sports device has a connecting ring having a first connector side opposite a second connector side and a central opening therebetween, the first connector side having a disc connector and the second connector side having a housing connector detachably connected to the second side of the housing.

In another aspect of the present disclosure provided herein, is a method for attaching and centering a disc sports device to a throwing disc including centering a connector ring by aligning a central opening of the connector ring to a center point of a throwing disc; attaching a first connector side to the throwing disc; centering a disc sports device on a disc by aligning a lip of a disc sports device with the circumference of the connector ring; attaching disc sports device to throwing disc by the connector ring; and minimizing throwing imbalance and a maximizing throwing data collection accuracy.

In another aspect of the present disclosure provided herein, is a method for attaching and centering a disc sports device to a plurality of throwing discs including centering a connector ring by aligning a central opening of the connector ring to a center point of a throwing disc; attaching a first connector side to the throwing disc; centering a disc sports device on the throwing disc by aligning a lip of the disc sports device with the circumference of the connector ring; aligning a first mating part on the disc sports device to a second mating part of the connector ring of a two part mating connector; attaching disc sports device to throwing disc by the connector ring; and minimizing throwing imbalance and a maximizing throwing data collection accuracy when throwing the first throwing disc; centering a second connector ring by aligning a central opening of the second connector ring to a center point of a second throwing disc; attaching a first connector side of the second connector ring to the second throwing disc; removing the disc sports device from the first throwing disc by detaching the mating part of the disc sports device; centering the disc sports device on the second throwing disc by aligning a lip of the disc sports device with the circumference of the second connector ring; aligning the first mating part on the disc sports device to a second mating part of the second connector ring; attaching the second connector ring to the disc sports device; and minimizing throwing imbalance and a maximizing throwing data collection accuracy when throwing the second throwing disc.

In another aspect of the present disclosure provided herein, is a system for measuring throwing disc throw data having a disc sports device having a circular housing, having a first side opposite a second side connected by a sidewall therebetween, forming a cavity having a printed circuit board assembly ("PCBA"), and a midline axis passing through the center of the first side, the center of the PCBA, and the center of the second side. The PCBA has a processor, a memory, a first accelerometer centered on the midline axis, a second accelerometer offset from the first accelerometer, a GPS module, a magnetometer, a gyroscope, and at least one wireless communication module, and a battery, with the battery wired to provide power to the PCBA; and the processor in data communication with the memory, the first accelerometer, the gyroscope, the second accelerometer, the magnetometer, the GPS module, the wireless communications module. The system further has a connecting ring having a first connector side opposite a second connector side and a central opening therebetween, the first connector side having a disc connector and the second connector side having a housing connector detachably connected to the second side of the housing, and the first side connected to and centered on a throwing disc; a network; a first computing device having a processor, data storage, a memory, and backend software, the software providing instructions to the processor; a second computing device having a processor, data storage, a memory, and frontend software, the software providing instructions to the processor. The disc sports device, the first computing device, and the second computing device are in network communication and data from the disc sports device from the first accelerometer, the gyroscope, the second accelerometer, the GPS module, is processed by the PCBA processor and transmitted by the wireless communications module through the network to the first computing device and second computing device for display to a user.

These and other objects, features, and advantages of this disclosure will become apparent from the following detailed description of the various aspects of the disclosure taken in conjunction with the accompanying drawings.

BRIEF DESCRIPTION OF THE DRAWINGS

FIG. 1, depicts a bottom view of a monitoring device connected to a disc, in accordance with one or more embodiments set forth herein;

FIGS. 2 and 3, respectively depict a top view and side view of the disc of FIG. 1, in accordance with one or more embodiments set forth herein;

FIG. 4, depicts a side view of the monitoring device of FIG. 1 connected to the disc, in accordance with one or more embodiments set forth herein;

FIG. 5, depicts a bottom perspective view of the monitoring device of FIG. 1, detached from and in relation to a midpoint of the disc, in accordance with one or more embodiments set forth herein;

FIG. 6, depicts a bottom perspective view of the monitoring device of FIG. 1 and a connection ring centered on the underside of the disc, in accordance with one or more embodiments set forth herein;

FIG. 7, depicts a second bottom perspective view of the monitoring device of FIG. 1 and the connection ring centered of FIG. 6 on the underside of the disc, in accordance with one or more embodiments set forth herein;

FIG. 12, depicts a top perspective view of the domed monitoring device of FIG. 8, in accordance with one or more embodiments set forth herein;

FIG. 13, depicts a side view of the domed monitoring device of FIG. 8, in accordance with one or more embodiments set forth herein;

FIG. 14, depicts a bottom perspective view of the domed monitoring device of FIG. 8, in accordance with one or more embodiments set forth herein;

FIG. 16, depicts a bottom perspective view of the connection ring of FIG. 6, in accordance with one or more embodiments set forth herein;

FIG. 17, depicts a top perspective view of the connection ring of FIG. 6, in accordance with one or more embodiments set forth herein;

FIG. 23, shows a communication flow chart of the monitoring device of FIG. 1, in accordance with one or more embodiments set forth herein.

DETAILED DESCRIPTION OF THE INVENTION

Figure 8:
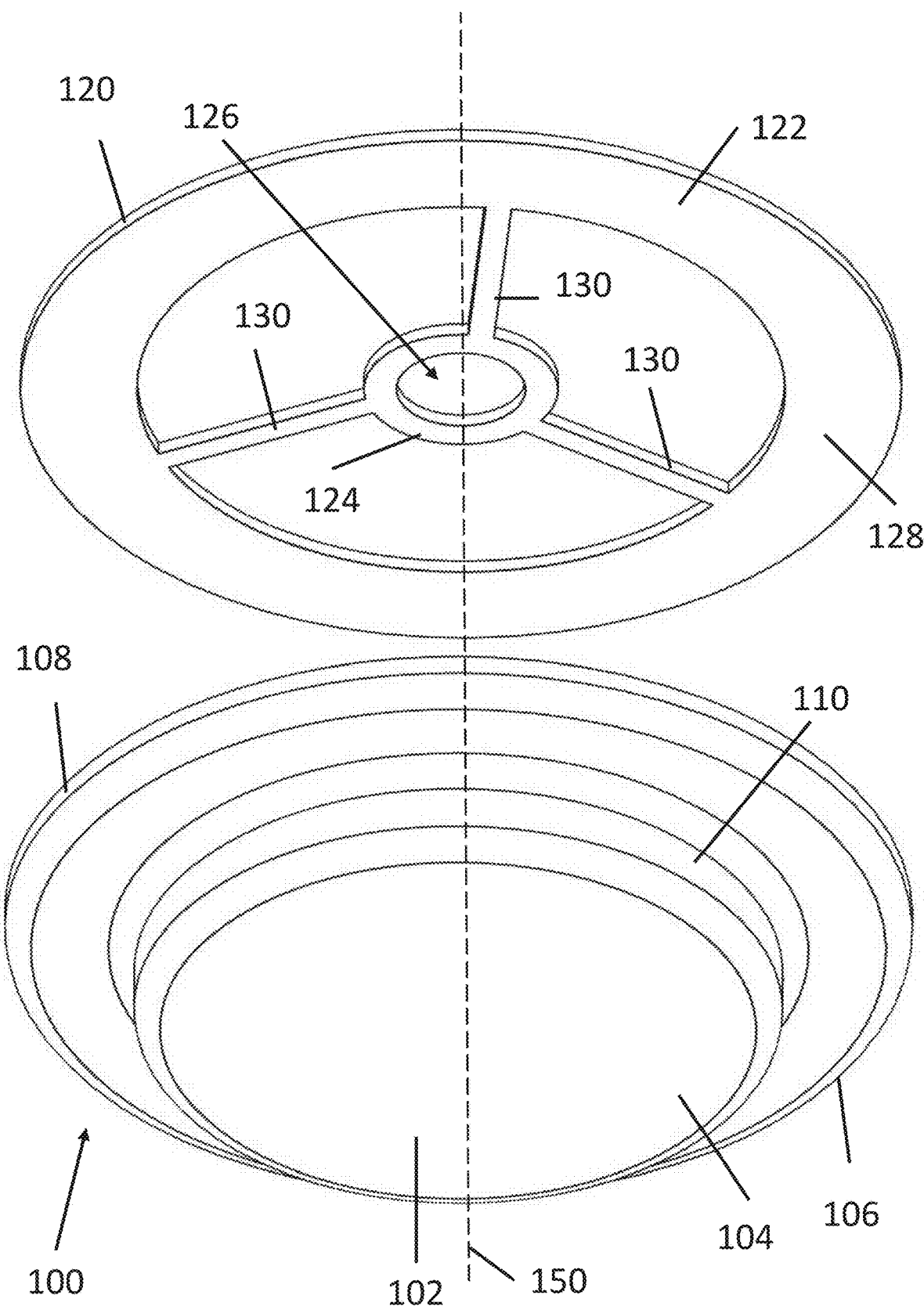
FIG. 8, depicts a bottom perspective view of the monitoring device of FIG. 1 and the connection ring of FIG. 6, in accordance with one or more embodiments set forth herein.

The present invention will be discussed hereinafter in detail in terms of various exemplary embodiments according to the present invention with reference to the accompanying drawings. In the following detailed description, numerous specific details are set forth to provide a thorough understanding of the present invention. It will be obvious, however, to those skilled in the art that the present invention may be practiced without these specific details. In other instances, well-known structures are not shown in detail to avoid unnecessary obscuring of the present invention.

Thus, all the implementations described below are exemplary implementations provided to enable persons skilled in the art to make or use the embodiments of the disclosure and are not intended to limit the scope of the disclosure, which is defined by the claims. As used herein, the word "exemplary" or "illustrative" means "serving as an example, instance, or illustration." Any implementation described herein as "exemplary" or "illustrative" is not necessarily to be construed as preferred or advantageous over other implementations.

Although certain methods are described with reference to certain steps that are presented herein in a certain order, in many instances, these steps may be performed in any order as may be appreciated by one having ordinary skill in the art. The methods are not limited to the particular arrangement of steps disclosed herein.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. In some instances, the approximating language may correspond to the precision of an instrument for measuring the value.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to "one embodiment" are not intended to be interpreted as excluding the existence of additional embodiments that also incorporate the recited features. Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any embodiments that "comprises," "has," "includes" or "contains" the presence of stated features, integers, steps, operations, elements, and/or components, but do not preclude the presence or addition of one or more other features, integers, steps, operations, elements, components and/or groups thereof. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be."

The invention herein will be better understood by reference to the figures wherein like reference numbers refer to like components. Referring to the drawings, wherein like reference numerals are used to indicate like or analogous components throughout the several views. With reference to FIG. 1, a generic throwing disc 200 is shown with a disc sports device 100, centered and attached to it the bottom or underside 202 of the disc 200. The disc sports device 100, may also be referred to as modular sensor-based disc sports device. A first side 104 of a housing 102 of the disc sports device 100 is visible. The generic throwing disc 200 may be circular. With reference to FIG. 2 a top surface 204 of the generic throwing disc 200 is shown. With reference to FIG. 3, a side view of the generic throwing disc 200 is shown. Other variants of the generic throwing disc 200 may exist, including ones that are not circular or ones that may have cut out spaces through the top and bottom surfaces the disc.

With reference to FIG. 4, a side view of the generic disc is shown, with the disc sports device 100 connected to the bottom surface 202 of the disc 200. With reference to FIG. 5, the disc sports device 100, is show detached from the disc 200, and a disc center point 210 is visible. A disc central axis 220 is show extending for positioning reference purposes extending through the disc center point 210 through the top surface 204 and the bottom surface 202. Since many disc sport discs are formed through injection molding, the center point 210 may also be the injection molding gate. The disc central axis 220 may be the axis about which the disc 200 rotates when thrown.

With reference to FIGS. 6 and 7, the disc sports device 100 is shown detached from the disc 200. A connector 120 is shown connected to the bottom surface 202 of the disc 200, and centered around the disc center 210 (See FIG. 5). The disc central axis 220 is also shown to illustrate the substantial alignment of the disc center 210 and the center of the connector 120.

With reference to FIG. 8, the disc sports device 100 is shown with the connector 120 detached. The housing 102 may be cylindrical. In this embodiment, the housing 102 has a first side 104 opposite a flanged ring 106. A sidewall 110 extends from the flanged ring 106 to the first side 104 and may form a cavity within the housing 102. The sidewall 110 may have a rounded or curved connection to the flanged ring 106. The sidewall 110 may have a rounded or curved connection to the first side 104. In certain other embodiments, the sidewall 110 may be cylindrical and connected to the first side 104 with no rounding or curvature. In certain embodiments the sidewall 110 may be cylindrical and connected to the flanged ring 106, with the connection having no rounding or curvature. The first side 104 may be flat or may have a domed shape extending from the sidewall and away from the flanged ring.

The flanged ring 106, may extend from the sidewall to a circumferential lip 108. The connector 120 may be circular and is depicted as having an outer ring 122 and an inner ring 124 connected by a plurality of arms 130 or spokes. In this embodiment, there are three arms 130. In certain other embodiments, there may be two arms or there may be more than three arms. In certain embodiments the connector 120 may be a single ring with a central opening 126.

Figure 9:
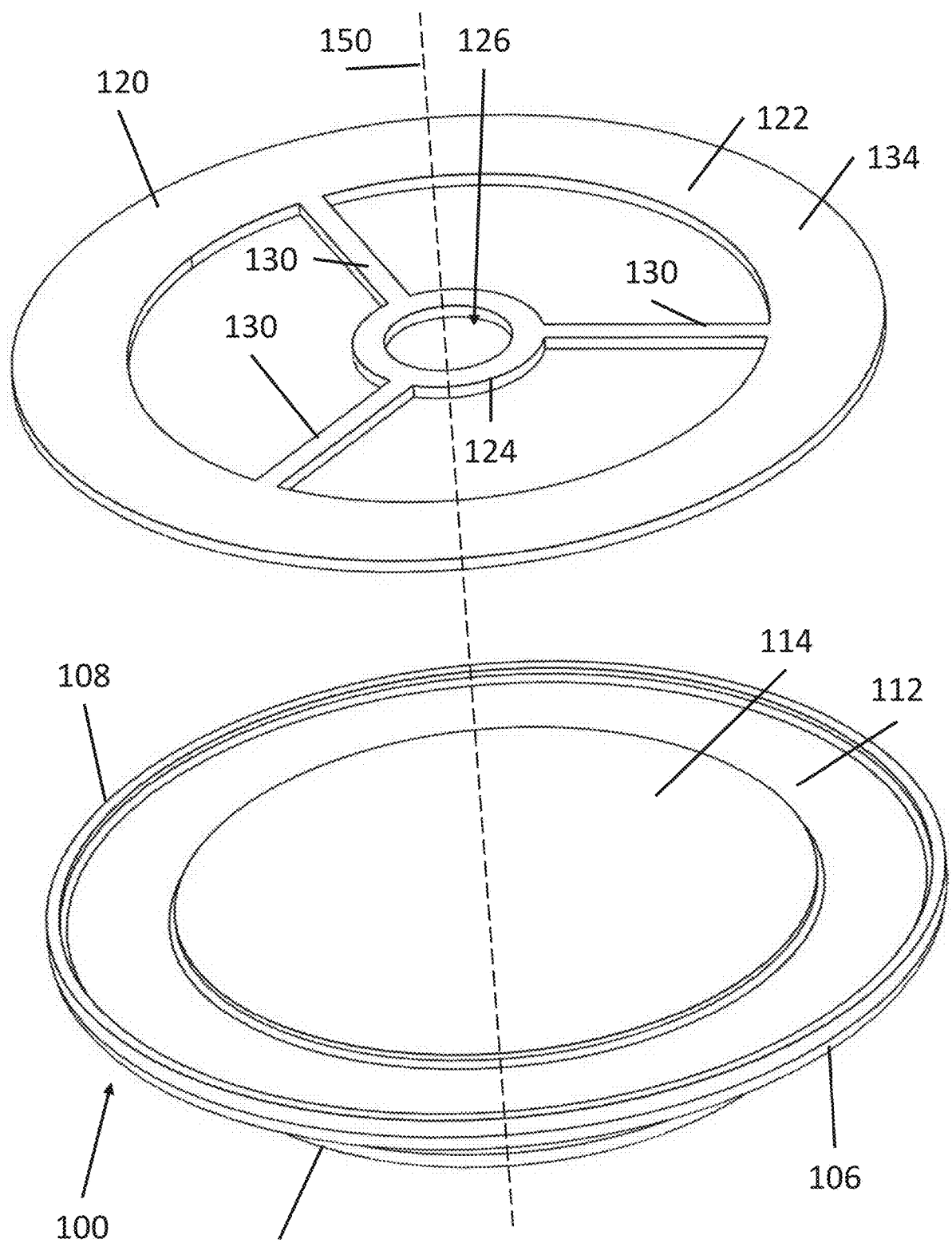
FIG. 9, depicts a top perspective view of the monitoring device of FIG. 1 and the connection ring of FIG. 6, in accordance with one or more embodiments set forth herein.

With reference to FIG. 9, the disc sports device 100 is shown with a second side 114 visible and the connecter 120 detached. The second side 114 is a disc facing surface (e.g., a surface facing the underside 202 of generic disc 200), surrounded by a connector groove 112, with the groove extending to the flange lip 108 of the flanged ring 106. The connector 120 may be placed such that the outer ring 122 fits within the connector groove 112.

The radial thickness of the outer ring 122 and the inner ring 124 may vary. The thickness of the outer ring 122 is configured (e.g., shaped and dimensioned) to fit within the connector groove 112.

In certain embodiments, the second side 114 may have slots to accommodate the plurality of arms 130 and the inner ring 124. In certain other embodiments, the second surface may extend to the flange lip 108, with no connector groove 112. The connector 120, may be placed on the second surface 114.

With reference to FIGS. 8 and 9, a device central axis 150 is depicted passing through the center of the disc sports device 100 and the central opening 126. The device central axis extends through the circular housing 102, through the center of the first side 104 and through the center of the second surface 114. For alignment purposes, the device central axis 150 is shown passing through the midpoint of the disc sports device 100 and through the center of the second surface 114, and extending through the inner ring 124 and central opening 126 of the connector 120.

Figure 10:
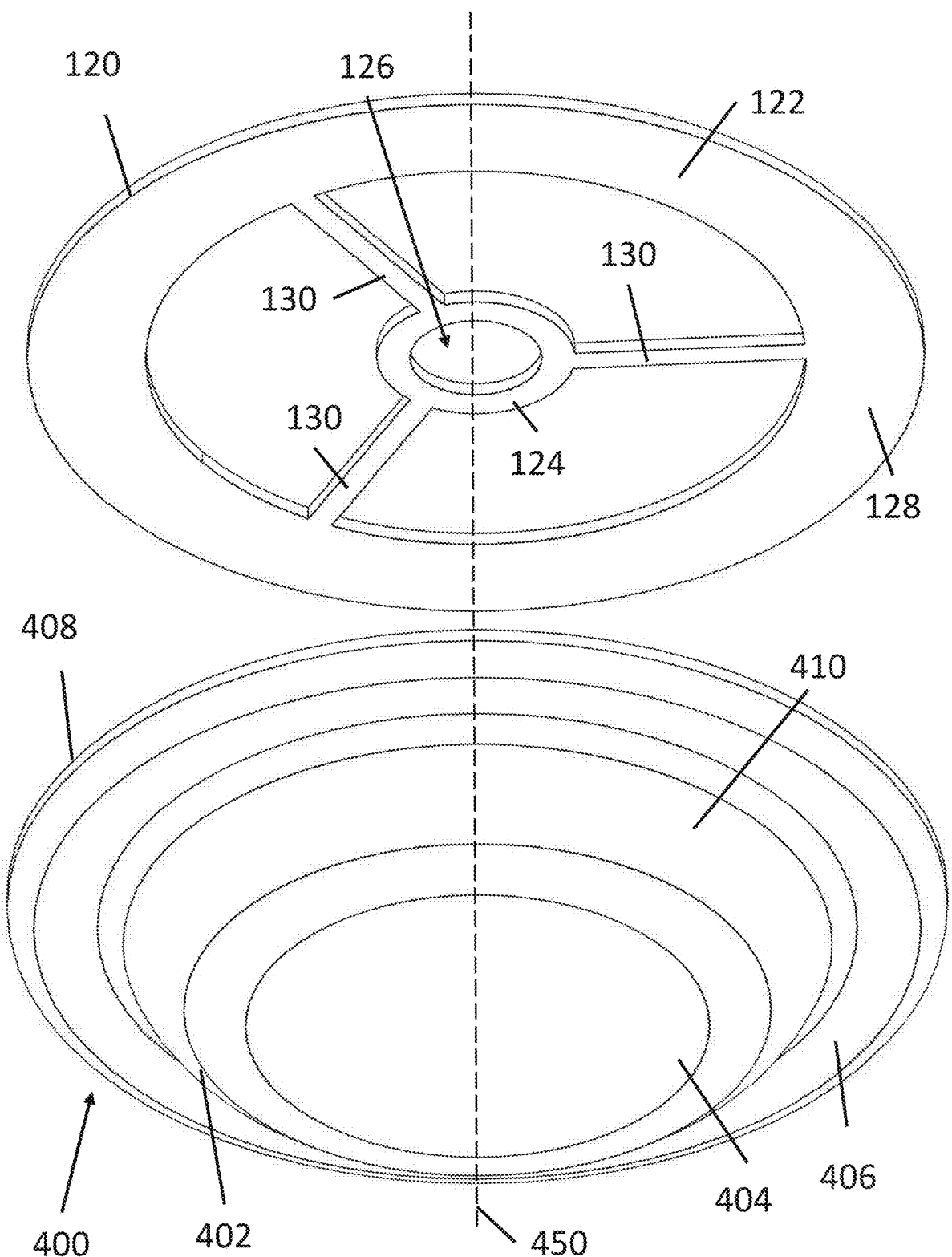
FIG. 10, depicts a bottom perspective view of a domed monitoring device and the connection ring of FIG. 6, in accordance with one or more embodiments set forth herein.

With reference to FIG. 10, an embodiments of disc sports device 100 may be disc sports device 400. Disc sports device 400 is shown with the connector 120 detached. Disc sports device 400 may have a housing 402. The housing 402 may be a hemispherical shape. In this embodiment, the housing 402 has a first side 404 opposite a flanged ring 406. A sidewall 410 extends from the flanged ring 406 to the first side 404 and may form a cavity within the housing 402. The sidewall 410 may have a rounded or curved connection to the flanged ring 406. The sidewall 410 may have a rounded or curved connection to the first side 404. In certain other embodiments, the sidewall 410 and the first side 404 may form a hemispherical shape extending out from the flanged ring 406, with no rounding or curvature separating the sidewall 410 and the first side 404. In certain embodiments the sidewall 410 may be connected to the flanged ring 406, with the connection having no rounding or curvature. The first side 404 may be flat or may have a domed shape extending from the sidewall and away from the flanged ring. The flanged ring 406, may extend from the sidewall to a circumferential lip 408.

Figure 11:
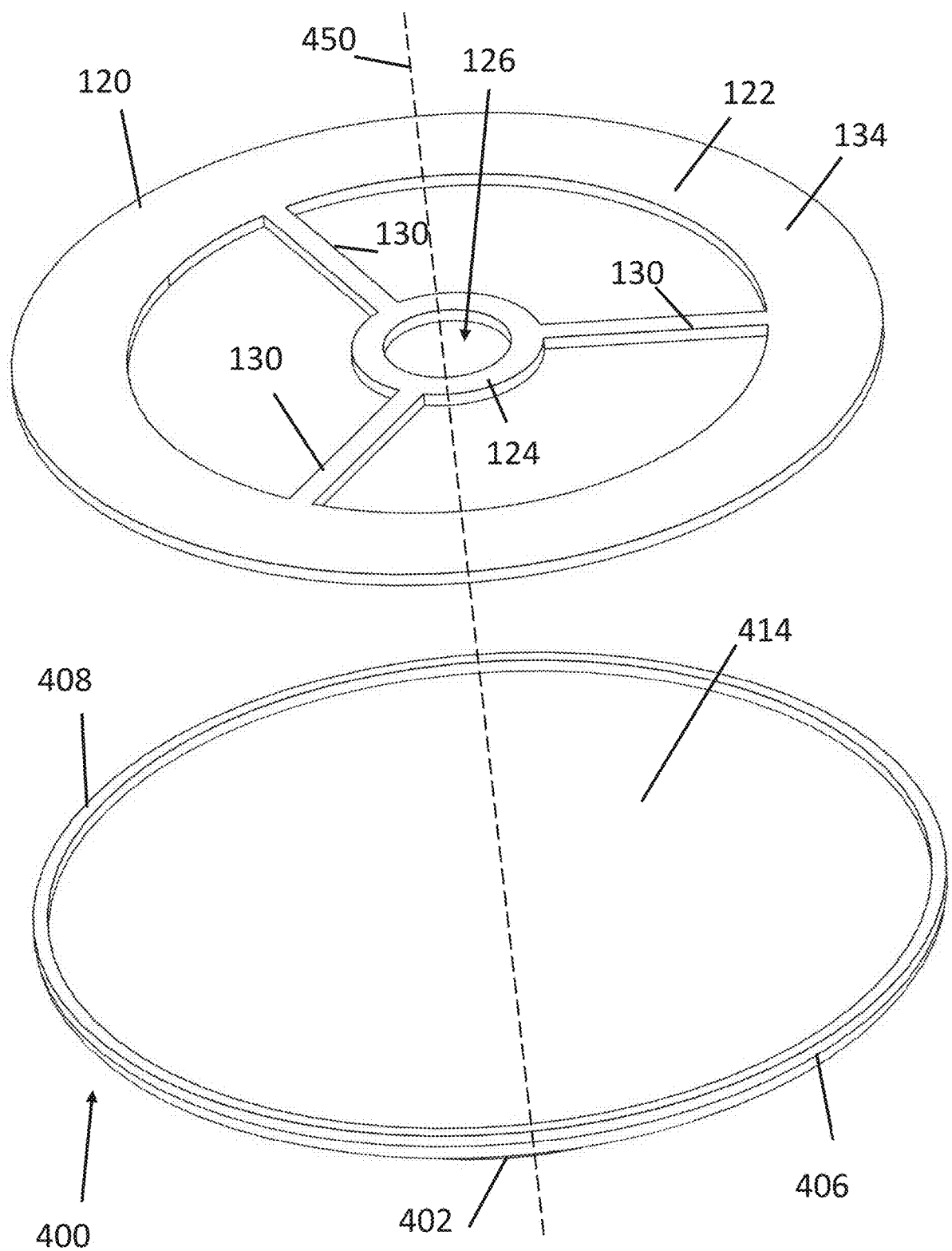
FIG. 11, depicts a top perspective view of the domed monitoring device of FIG. 8 and the connection ring of FIG. 6, in accordance with one or more embodiments set forth herein.

With reference to FIG. 11, the disc sports device 400 is shown with a second side 414 visible and the connecter 120 detached. The second side 414 is a disc facing surface (e.g., a surface facing the underside 202 of generic disc 200), surrounded by the flange lip 408 of the flanged ring 406. The connector 120 may be placed such that the outer ring 122 fits within the boundaries of the flanged lip 408.

With reference to FIGS. 10 and 11, a device central axis 450 is depicted passing through the center of the disc sports device 400 and the central opening 126. The device central axis extends through the housing 402, through the center of the first side 404 and through the center of the second surface 414. The device central axis 450 is shown passing through the midpoint of the disc sports device 400 and through the center of the second surface 414, and extending through the inner ring 124 and central opening 126 of the connector 120. The Referring to FIGS. 9 and 11, the second side 114 with groove 112 is shown on disc sports device 100, but the disc sports device 400 may have second side 114 with a groove 112 in certain embodiments. Similarly, the second side 414 without a groove is shown on disc sports device 400, but the disc sports device 100 may have second side 414 without a groove.

With reference to FIGS. 12-14, a top perspective view, a side view, and a bottom perspective view of the disc sports device 400 are respectively shown.

Figure 15:
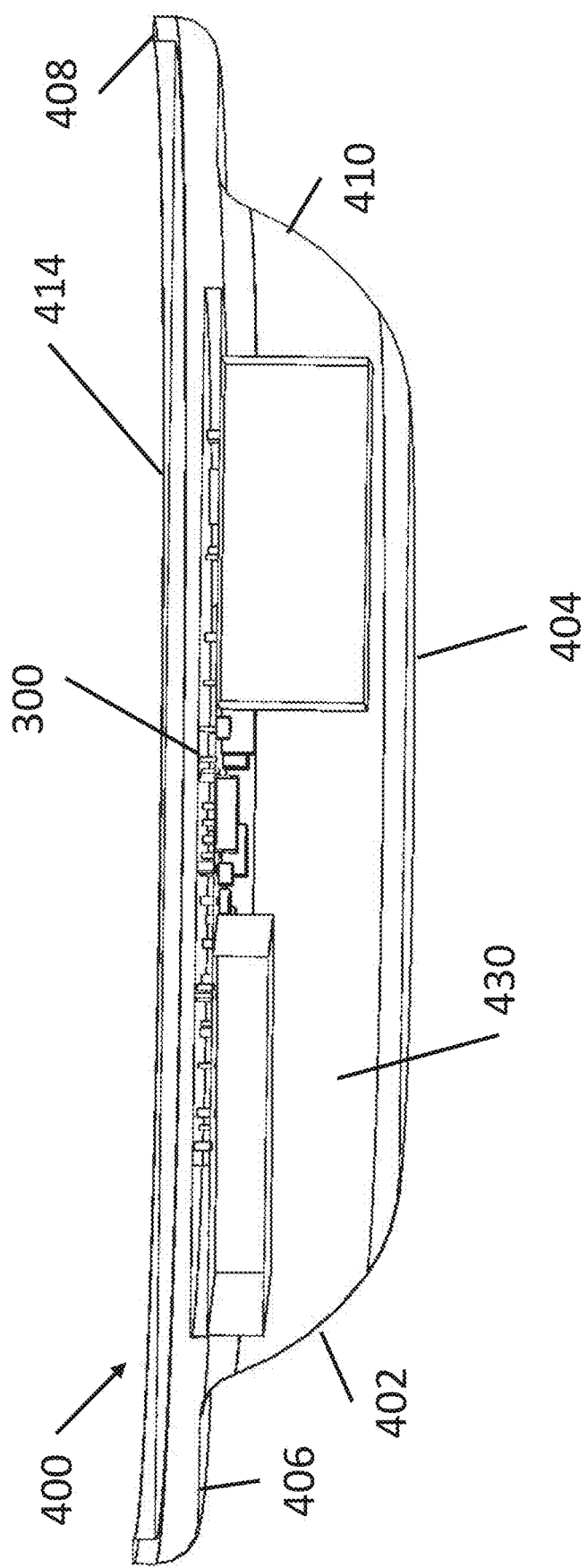
FIG. 15, depicts a cross section, side view of the domed monitoring device of FIG. 8 with a printed circuit board assembly, in accordance with one or more embodiments set forth herein.

With reference to FIG. 15, a cross sectional view of disc sports device 400 is depicted. A printed circuit board assembly ("PCBA") 300 is depicted within a cavity 430 within the housing 403 of the disc sports device 400. The cavity 430 is between the second surface 414, the first side 404, and the sidewall 410. Second side 414 extends to form part of the flanged ring 406. The PCBA 300 is within the housing and positioned on the interior side of the flanged ring 406 and may be fastened or connected to the base 406. In this embodiment, the housing 402 may be formed of a urethane foam, encapsulating the PCBA 300 within the disc sports device 400 and minimizing the size of the cavity 430. By minimizing the size of cavity 430, the PCBA 300 may be accommodated within the housing 402, with minimal free space for the PCBA to move within. Urethane foam may also act to cushion the PCBA 300 from impacts when the disc sports device 400 is connected to the disc 200 and thrown.

While the interior cross section of disc sports device 100 is not shown, PCBA 300 may be similarly positioned within an internal cavity of the housing 102. Disc sports device 100 may also have a housing 102 formed of a urethane foam.

The housing 102 may be formed of a material that flexes allowing the disc sports device 100 to flex with the disc 200 to which the device 100 is attached. Similarly, the housing 402 may be formed of a material that flexes allowing the disc sports device 400 to flex with the disc 200 to which the device 400 is attached. The housing material may be a semi-rigid material having some flexibility. Materials may include, for example, plastics such as urethane foam, polyurethane, polyvinyl chloride, polyethylene, or polypropylene. Other materials may include other plastics or non-plastics having similar material characteristics and properties. The housing 102 (and similarly, housing 402) may be formed through an injection molding process surrounding the PCBA 300 with the semi-rigid material.

Connector 120, connector 420, and second connector 440 may also be formed of a material that flexes. In certain embodiments, the material may be a semi-rigid material. Materials may include, for example, plastics such as urethane foam, polyurethane, polyvinyl chloride, polyethylene, or polypropylene. Other materials may include other plastics or non-plastics having similar material characteristics and properties. The connector 120 and connector 420 may be formed through an injection molding process. In certain other embodiments, connector 120 may be formed from a paper with an adhesive surface on either side.

In a preferred embodiment, the connector (e.g., connector 120 or connector 420 and second connector 440) and the housing materials are flexible enough to allow the disc sports device (e.g., disc sports device 100 or disc sports device 400) to bend and flex with movements of the disc 200 during flight as well as during impacts with objects. The flexible materials allow the disc sports device (e.g., disc sports device 100 or disc sports device 400) to remain attached to the disc 200 using lower adhesive forces or connecting forces than would be required if rigid. The flexible nature of the housing material allows the user to press buttons (e.g., the power button 308) on the PCBA 300 while the PCBA 300 remains encapsulated in the housing (e.g., housing 102 or housing 402). Also, the housing material provides cushioning for the PCBA 300 minimizing damage caused by impacts with objects during disc flight or on landing. The housing material also provides a water-resistant enclosure around the PCBA 300 which protects it from water/moisture.

Referring to FIG. 16, the connector 120 is shown with the interior ring 124 connected to the exterior ring 122 by the plurality of arms 130. A second connector side 128 is visible. Referring to FIG. 17, a first connector side 134 of the connector 120 is visible. The first connector side 134 and the second connector side 128 may each have an adhesive material applied. The adhesive may be a glue or a double sided tape or a similar adhesive.

Figure 18:
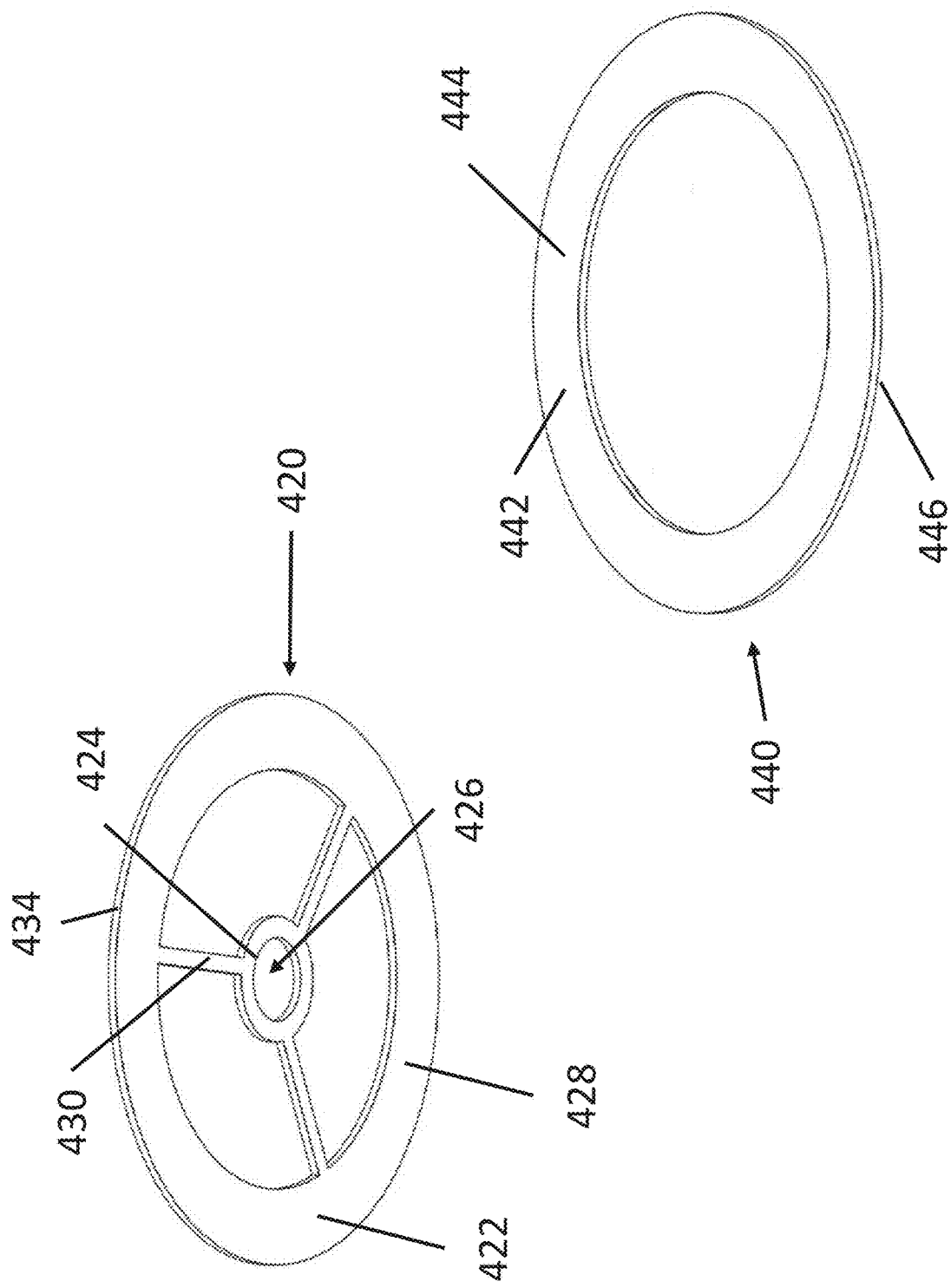
FIG. 18, depicts a perspective view of a two part connection ring, in accordance with one or more embodiments set forth herein.

With reference to FIG. 18, a two part connector may be used instead of connector 120, with the first part being a first connector 420 and the second part may be a second connector 440. First connector 420 may have an outer ring 422 and an inner ring 424, with the inner ring having a central opening 426. Outer ring 422 may have an adhesive side 434 and one part of a mechanical fastener on side 428. The term mechanical fastener includes two part connectors or mating fasteners such 3M Dual Lock, hook and loop, or other similar fasteners. In other embodiments, the mechanical fastener may be magnets. The first connector 420 may also have a plurality of arms (or spokes) 430 connecting the inner ring 424 with the outer ring 422. The second connector 440 may be a ring 442 with an adhesive applied to an adhesive side 446 and the second part of a mechanical fastener on a fastener side 444. By connecting the two side of the mechanical fasteners together, the first connector 420 and the second connector 440 may be removably connected.

Figure 20:
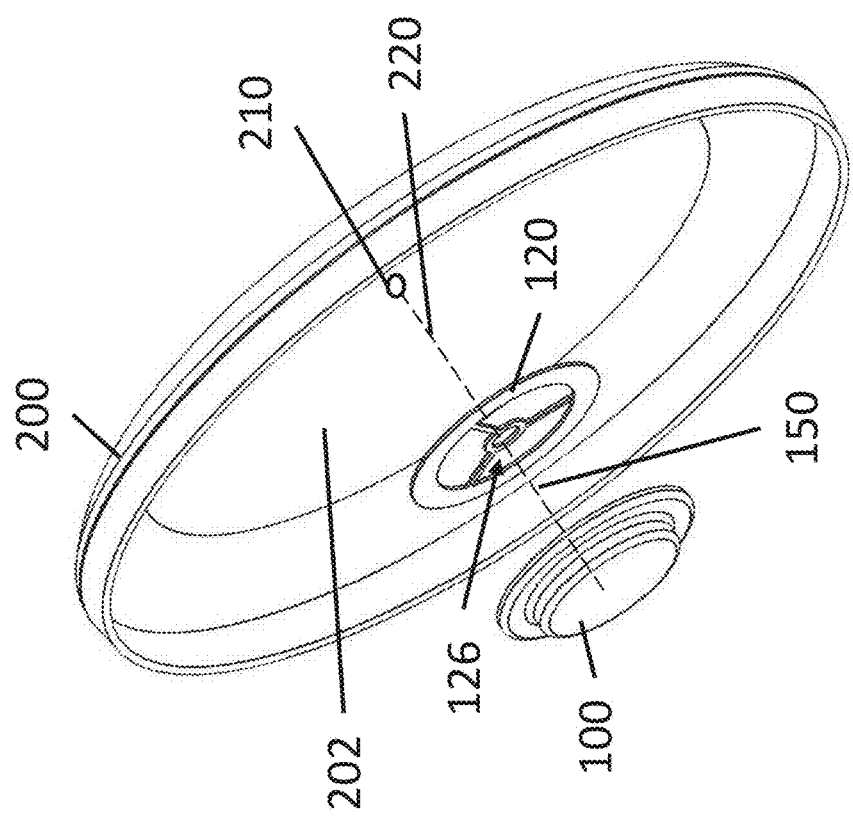
FIG. 20, depicts an exploded bottom perspective view of the monitoring device of FIG. 1, the connection ring of FIG. 6, and the disc, in accordance with one or more embodiments set forth herein.
Figure 19:
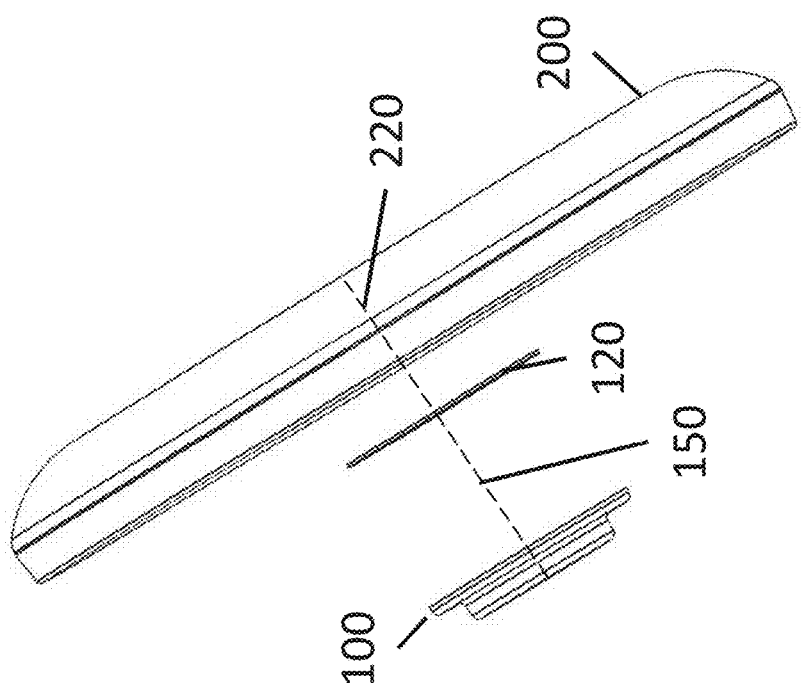
FIG. 19, depicts an exploded side perspective view of the monitoring device of FIG. 1, the connection ring of FIG. 6, and the disc, in accordance with one or more embodiments set forth herein.

Referring to FIG. 19, the disc sports device 100, the connector 120, and the disc 200, are shown aligned with the device central axis 150 coaxial with the disc central axis 220. Referring to FIG. 20, the disc sports device 100, the connector 120, and the disc 200, are shown aligned with the device central axis 150 coaxial with the disc central axis 220 and the disc center 210. The central opening 126 of the connector 120 may be configured (e.g., shaped and dimensioned) to fit around disc center 210, such that connector 120 may be centered on disc 200. Disc sports device 100 may be connected to connector 120 such that disc sports device 100 may be centered on disc 200. Central opening 126 of the connector 120 is shown aligned so that the device central axis 150 coaxial with the disc central axis 220 pass through the central opening 126.

While FIGS. 19 and 20 refer to positioning of disc sports device 100 on disc 200, disc sports device 400 may be similarly positioned. The disc sports device 400 may be connected to the second connector 440. The first connector 420 and the disc 200 may be aligned, with the device central axis 450 coaxial with the disc central axis 220. The disc sports device 400, the connector 420, and the disc 200, may be aligned with the device central axis 450 coaxial with the disc central axis 220 and the disc center 210. The Central opening 426 of the connector 420 may be configured (e.g., shaped and dimensioned) to fit around disc center 210, such that connector 420 may be centered on disc 200. Disc sports device 400 may be connected to connector 420, by second connector 440, such that disc sports device 400 may be centered on disc 200. Central opening 426 of the connector 420 may be aligned so that the device central axis 450 coaxial with the disc central axis 220 pass through the central opening 426.

Figure 21:
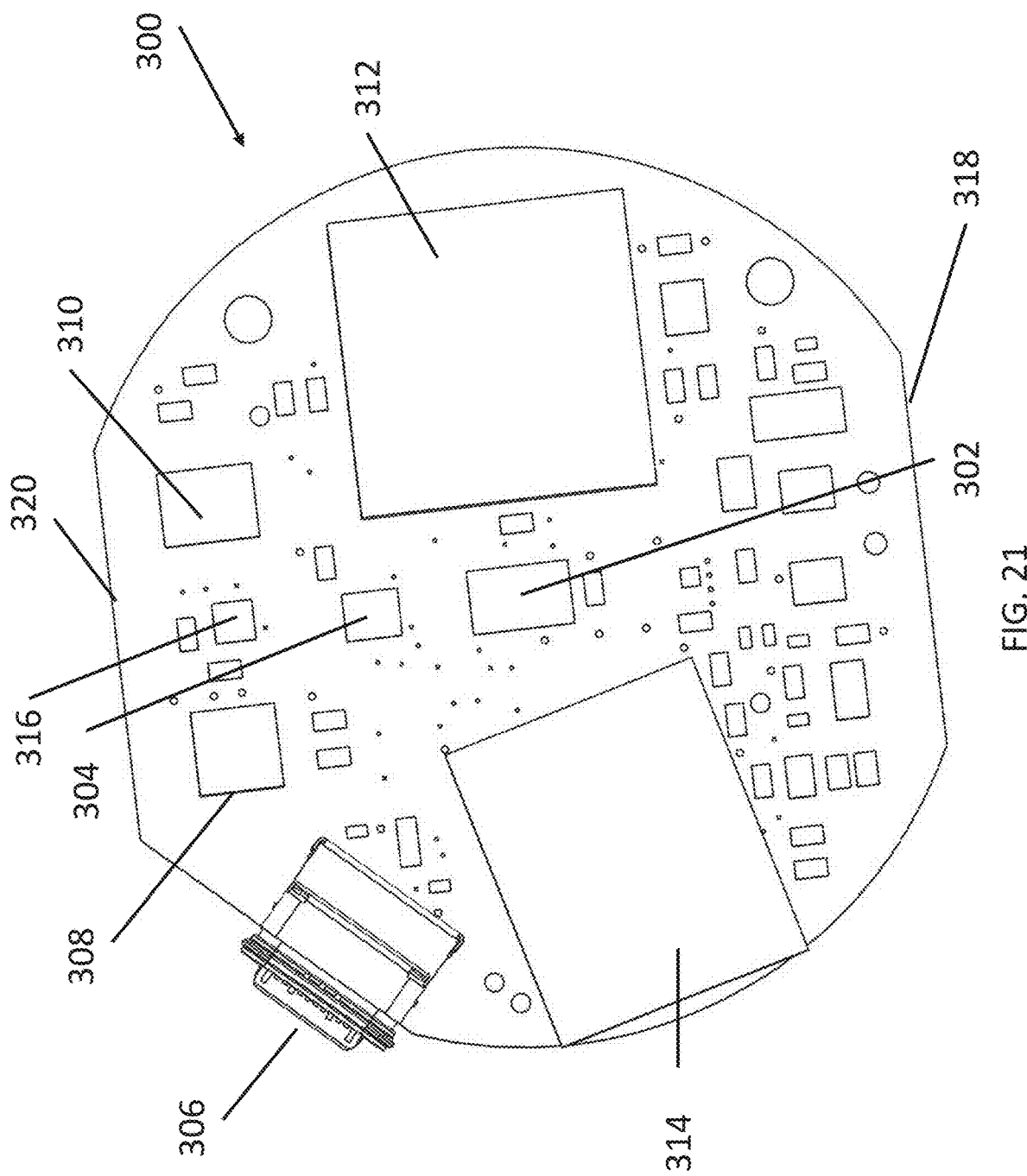
FIG. 21, depicts an internal circuit board of the monitoring device of FIG. 1, in accordance with one or more embodiments set forth herein.

With reference to FIG. 21, the PCBA 300 is shown. The PCBA is housed within the device housing 102. The PCBA 300 has a gyroscope and accelerometer centered on the PCBA within a gyroscope and accelerometer device unit 302, and integrated into the PCBA. The gyroscope and the accelerometer may be in data communication contact. The gyroscope and accelerometer device unit 302 may be centered or approximately centered within the disc sports device 100, and coaxial with the central axis 150 (see FIGS. 10-13). With continued reference to FIG. 16, the accelerometer within the gyroscope and accelerometer device unit 302 may be centered on the PCBA and device and may be a first accelerometer.

In this particular embodiment, the gyroscope and accelerometer device unit 302 has a gyroscope and an accelerometer as a single device unit. In other embodiments, the gyroscope and accelerometer may be two separate devices, positioned substantially at the center of or centered on the PCBA.

The PCBA 300 further has a second, offset accelerometer 304 integrated with the board but offset from the first accelerometer within the gyroscope and accelerometer device unit 302. The offset accelerometer may be positioned radially off-center or away from the center of the PCBA. The PCBA 300 is show as being a circular or substantially circular shape. In certain embodiments the PCBA may be a different shape with the first accelerometer within the gyroscope and accelerometer device unit 302 centered on the board and the offset accelerometer 304 positioned off-center or away from the center of the PCBA and the first accelerometer.

The PCBA may have a processor and a Bluetooth® communication microcontroller shown as a processor and communication unit 314. In other embodiments, the processor and the Bluetooth® communication microcontroller may be separate devices integrated within the PCBA 300. The Bluetooth® microcontroller may be a low energy microcontroller or BLE SOC. The processor and the Bluetooth® microcontroller may be in data communication contact with each other.

The PCBA may also have a global positioning system module ("GPS module") and battery show as a GPS module and battery unit 312. The GPS module and battery are shown integrated into a single device unit, but in other embodiments may be two separate devices integrated within the PCBA 300. The battery may provide power to all of the circuits of the PCBA 300, including the GPS module.

The PCBA may further have integrated a USB port 306, memory 310, a power button 308, and a magnetometer 316. The power button 308 may be configured to provide additional functions via software. Memory 310 may be, for example, flash memory. In certain other embodiments, there may be additional memory providing longer term data storage. In certain embodiments, the power button 308 may be a button, connectable to a button or press feature of the flexible housing 102, with the power button 308. Power from the battery of the GPS module and battery 312, may be provided via the power button 308.

While not shown on the PCBA 300, one or more of a WiFi module, a cellular module, a Zigbee wireless module, a radio frequency transceiver ("RF transceiver"), or other common communication circuits or controllers ("wireless communication controller") may be attached to the PCBA and configured to provide wireless data communication between the device and a computing device, such as a networked computer or mobile computing device. In certain other embodiments one or more of the WiFi module, a cellular module, a Zigbee wireless module, the RF transceiver, or other wireless communication controllers may be within the processor and communication unit 314.

The gyroscope and accelerometer device unit 302, the offset accelerometer 304, the magnetometer 316, and the GPS module of the GPS and battery unit 312, may be in data communication with the processor of the processor and communication unit 314. The processor of the processor and communication unit 314 may be in data communication with the memory 310 and the communication component of the processor and communication unit 314. In other embodiments, the processor of the processor and communication unit 314 may send data communications to other communication devices connected to the PCBA (e.g., the WiFi module, the Zigbee wireless module, the RF transceiver, or similar communication devices) to a computing device configured to directly receive such communication signals or to receive such communication signals via a network.

The PCBA may be rounded or configured (e.g., shaped and dimensioned) to fit within the housing 102, with a first housing mounting location 318 and a second housing mounting location 320 configured (e.g., shaped and dimensioned) to fit within and connect to the internal walls or the internal facing side of the flange base 106. The PCBA may have, for example, gyroscope and accelerometer device unit 302, the offset accelerometer 304, and the GPS module and battery unit 312, centered within the housing 102.

The first accelerometer and gyroscope within the gyroscope and accelerometer device unit 302 may be centered with respect to the central axis 150 and the offset accelerometer 304 may be offset, for example, positioned radially away from center or from the central axis 150. The offset accelerometer 304 may be positioned radially between the central axis 150 and the edge of the PCBA 300. The offset positioning between the two accelerometers provides for an increase in the range of measured rotational rate around the central axis 150 of the device. The accelerometer and the gyroscope of the gyroscope and accelerometer device unit 302 may, for example, identify the motion of the disc, with such motion including rotation and translation of the disc. The off-center accelerometer 304 a second set of rotational measurements, increasing the range of measured rotational rate around the central axis 150 of the disc. Measurements from the first accelerometer, the gyroscope, and the offset accelerometer 304 provide for the detection of disc throwing motion, throw initiation, release angle, and throw completion, and may perform the calculation of various throwing metrics and for disc flight characterization.

The GPS module of the GPS module and battery unit 312, may identify the start and end point of all disc throws and may track the location of a disc throughout the full path of flight. The GPS module would provide location tracking of the disc during flight, but would need to be capable of receiving location data from multiple GPS satellites or from other hardware communication devices that allow for disc location to be determined in real-time via one or another mechanism (e.g., triangulation of multiple cell towers with known locations, GPS location data received from three or more GPS sources or satellites, etc.).

The PCBA 300 may be made from a semi-rigid material but preferably from a flexible material.

Method of Disc Sports Device Alignment with Disc

Figure 22B:
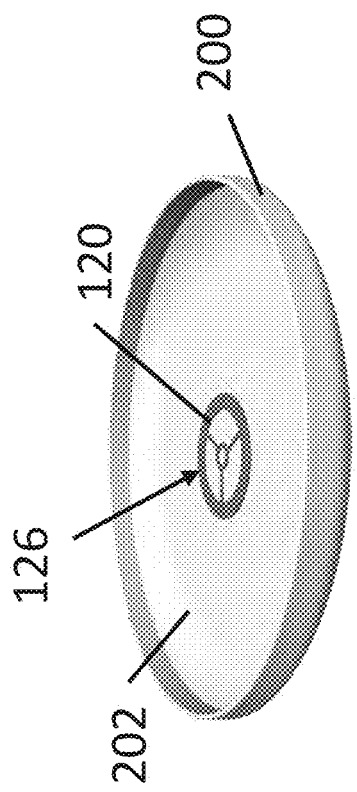
FIG. 22A-22D, depicts the steps for connecting the monitoring device of FIG. 1 to the disc, in accordance with one or more embodiments set forth herein
Figure 22D:
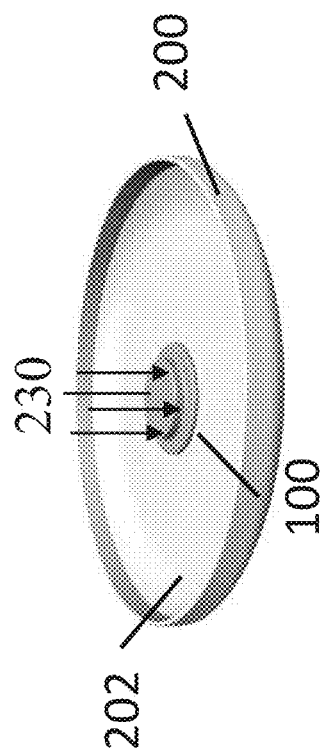
Figure 22A:
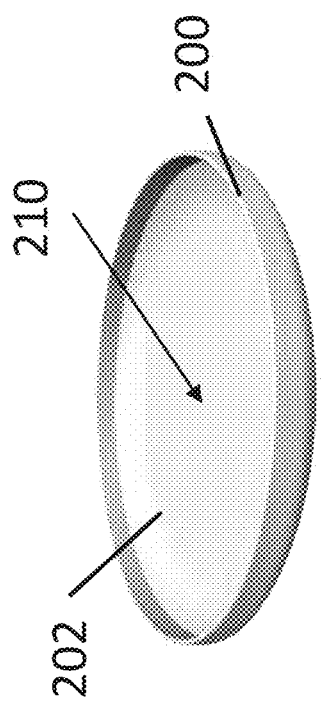
Figure 22C:
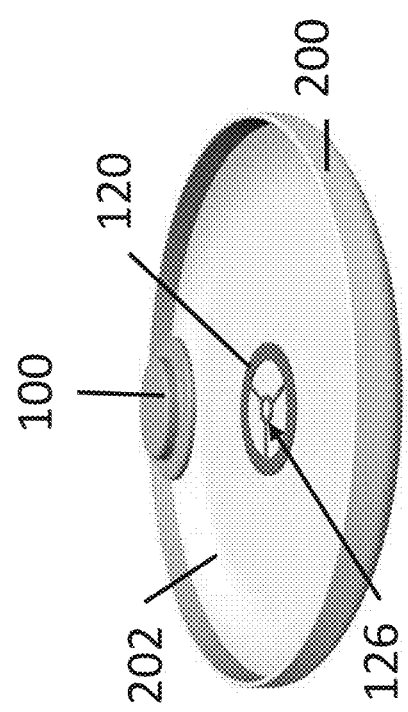

A device for measuring disc performance that is not centered on a disc may result in unbalanced disc throws and inaccurate measurements. The closer the device is to central alignment with the disc, the more balanced the disc is for throwing. Referring to FIG. 22A, the disc center 210 is located on the disc 200. In FIG. 22B, the connector 120 is aligned, such that the central opening 126 of the inner ring 124 and the disc center or molding gate (e.g., the disc center 210) are aligned. Referring to FIG. 22C, the disc sports device 100 may then be aligned with the connector 120, by aligning the connector groove 112 and the edges of the device (e.g., the flange lip 108) with the edges of the connector 120. Referring to FIG. 22D, after aligning the connector 120 and the disc sports device 100, pressing 230 the device 100 onto the disc 200. Such an alignment may center or substantially center the disc sports device 100 on the disc 200 and provide for more balanced throws while measuring disc-throw data.

The modular sensor-based disc sports device provides for connecting the disc sports device 100 to disc 200 via the connector 120. The disc device 100 may be detached as needed and reattached to any other disc, using the steps identified in FIGS. 20A-20D. In particular, the connector 120 is designed to help the user easily center the device to any disc of their choice. Thus, the combination of the disc sports device 100 with the connector 120 described in this disclosure is superior to just attaching the disc sports device 100 to the disc 200 with another mechanism (e.g., via other tape, glue, or other) since centering is so vital to capturing accurate metrics of a user's disc throws, and any misalignment may result in severely skewed data metrics. While reference is made to disc sports device 100 in FIGS. 20A-20D, one skilled in the art would understand that disc sports device 400 may be similarly connected to disc 200 via the connector 420 and the second connector 440.

With reference to FIGS. 9, 16, 17, 19, and 20, connector 120 may be applied to disc 200, such that first connector side 134 is placed on the bottom surface 202 and disc sports sensor 100 may be connected to the disc 200 by positioning connector 120 within the flange base lip 108 pressing the second side 114 against the second connector side 128, such that the outer ring 122 is positioned within the groove 112 and the adhesive on the outer ring 122, inner ring 124, and the plurality of support arms 130 are pressed against the second side 114.

In certain embodiments, an adhesive may be applied to the groove 112 instead or in addition to an adhesive on the connector second connector side 128.

With reference to FIGS. 11, 16, 17, 19, and 20, disc sports sensor 400, connector 120 may be applied to disc 200, such that first connector side 134 is placed on the bottom surface 202 and disc sports sensor 400 may be connected to the disc 200 by positioning connector 120 within the flange base lip 408 pressing the second side 414 against the second connector side 128, such that the adhesive on the outer ring 122, inner ring 124, and the plurality of support arms 130 are pressed against the second side 414.

In certain embodiments, an adhesive may be applied to the second side 414 instead or in addition to an adhesive on the connector second connector side 128.

Connector 420 may be inserted onto disc sports device 100 by placing the ring 442 with the adhesive side 446 facing the second side 114 into groove 112 (see disc sports device 100 of FIG. 9) and the part of the mechanical fastener facing out from the fastener side 444. Second connector 440 may be inserted onto disc sports device 400 by placing the ring 442 with the adhesive side 446 facing the second side 414 and the part of the mechanical fastener facing out from the fastener side 444 (see disc sports device 400 of FIG. 11).

In another embodiment, second ring 440 may be molded into disc sports device 100 with fastener side 444 facing outwards from second side 114. In another embodiment, second connector 440 may be molded into disc sports device 400 with fastener side 444 facing outwards from second side 414. Mating dual lock material is also molded into the sensor, allowing the sensor to be attached, detached and reattached.

Connector 120 may be applied to disc 200. Depending on the strength of the adhesive or glue, the connector 120 may be removable from the disc 200 and from disc sports device 100 (or disc sports device 400). With certain adhesives, connector 120 may be applied to a second disc and disc sports device 100 (or disc sports device 400) may be attached to connector 120 on the second disc. For connectors 120 made of paper, a new connector may need to be applied to each disc and the connector may be disposable.

Connector 420 may be applied to disc 200. Depending on the strength of the adhesive or glue, the connector 420 may be removable from the disc 200. Second connector 440 may be attached to or incorporated into the housing 102 of disc sports device 100 (or the housing 402 of disc sports device 400). With certain adhesives, connector 420 may be applied to a second disc and disc sports device 100 (or disc sports device 400) may be attached to connector 420 by the fastener (e.g., the mechanical fastener) on the second connector 440. For certain other embodiments, a plurality of connectors 420 may be applied to a plurality of discs. Thus, disc sports device 100 (or disc sports device 400) may be removed from one disc and attached to another disc by the mechanical fastener when a user is switching discs or sports.

Referring to FIGS. 9-12, and 15, the flanged ring (e.g., flanged ring 106 or 406) may a part of the housing (e.g., housing 102 or housing 402) and formed by an injection molding process forming the housing. In certain embodiments, there may be no flanged ring and the sidewall (e.g., sidewall 110 or sidewall 410) may extend to a lip (lip 108 or lip 408), extending away from the second side (e.g., second side 114 or second side 414). However, it is preferred to have a flanged ring. The flanged ring may be formed of the same flexible or semi rigid material as the housing and may serve to make attaching and detaching the disc sports device (e.g., disc sports device 100 or disc sports device 400) easier while providing less stress on the housing and the electronics of the PCBA 300. The flanged ring provides for a gripping area, minimizing stress due to removal since a use may grip the flanged ring to pull the disc sports device away from the disc. The flanged ring provides for a pressing area, minimizing stress due to attachment since a use may press the flanged ring to attach the disc sports device and maximize the connection of the fasteners or adhesive between the connector 120 and the disc sports device or between the connector 420 and the second connector 440 on the disc sports device.

In certain other embodiments, the outer surface of housing 102 and housing 402 may be dimpled to encourage housing flex during disc throws.

Data Collection

The operation of the PCBA 300 when used with the disc sports device 100 or disc sports device 400, is described below. Referring to FIG. 21, a battery 510 provides power to a global positioning system module (GPS) 508, a gyroscope 506, and offset accelerometer 504, a central accelerometer 502, a processor 512, a magnetometer 516, and a wireless communication module 518. The GPS 508, the gyroscope, the offset accelerometer 504, and the central accelerometer 502 are in communication contact with the processor 512. Referring to FIGS. 19 and 21, the gyroscope 506 and the central accelerometer 502 may be within a single device as in the gyroscope and accelerometer device unit 302, the GPS 508 and the battery 510 may be within a single device as in the GPS module and battery unit 312, and the processor 512 and communication module 518 may be within a single device as in the processor and communication unit 314. The processor 512 receives and processes data and send the data to the communication module 518. The communication module may be one or more of a Bluetooth® device, a Wi-Fi module, a Zigbee® wireless module, an RF transceiver, a cellular module, or a similar communication device. The communication module 518 may send and receive a data signal to a computing device 520 (e.g., computer, mobile computing device, mobile phone, and similar devices). In certain embodiments, the communication module 518 may directly communication with the computing device 520 but in others, the communication may be via a network. The cellular module includes standard mobile phone data communication protocols include commonly used cellular phone communication protocols and data communication protocols, such as, for example, 2G, 3G, 4G, 5G, or other similar communication protocols.

When attached to the throwing disc, the disc sports device 100 may perform numerous motion measurements of disc motion. The offset positioning between the central accelerometer 502 and the offset accelerometer 504 provides for an increase in the range of measured rotational rate around the central axis 150 of the device. The central accelerometer 502 and the gyroscope 506 may, for example, identify the motion of the disc, with such motion including rotation and translation of the disc, when the disc is thrown. The offset accelerometer 504 may provide a second set of rotational measurements, increasing the range of measured rotational rate of the disc. Measurements from the central accelerometer 502, the gyroscope 506, and the offset accelerometer 504 may be used to, for example, detect disc throwing motion, throw initiation, pump fakes and flight dynamics (e.g., stability, wobble, etc.), and throw completion. The magnetometer 516 may be used for measuring the orientation of the sensor, and thus the device and the disc, in space. The central accelerometer 502, the gyroscope 506, the magnetometer 516 and the offset accelerometer 504 send data to the processor 512, which may perform the calculation of various throwing metrics. The data gathered by the processor 512 may be sent to the communication module 518, The GPS 508 may identify the start and end point of all disc throws and may track the location of a disc throughout the full path of flight. The GPS 508 may provide location tracking of the disc during flight. In certain embodiments, the GPS 508 may be configured to receive location data from a single GPS satellite or multiple GPS satellites. In still certain other embodiments, the GPS 508 may be configured to receive positioning data communications from one or more satellites, wireless mobile device carriers, or other hardware communication devices that allow for disc location to be determined in real time, such as such as triangulation of multiple cell/mobile phone towers with known locations or GPS location data received from three or more GPS sources or satellites.

The raw data measurements of these sensors (e.g., the gyroscope 506 and the central accelerometer 502 may be within a single device as in the gyroscope and accelerometer device unit 302, and the GPS 508 may be in a single unit as in the GPS and battery unit 312) may be transmitted to the computing device 520, which may have software 514 (e.g., a mobile app or front end software) via Bluetooth. The software 514 may have instructions used by the computing device 520 for further data processing to identify, for example, the angle of the disc during various phases of a throw. Alternatively, or in conjunction with transmission of the data via Bluetooth, the WiFi module and/or cellular module may upload the raw data via a network to a website, which may include a backend processing server (e.g., via a network to a cloud server that hosts a cloud application service to which the website is a user interface for users to interact with the service) to identify the angles of disc throws and provide further data analysis. GPS data from the GPS module 508 may be transmitted by the processor 512 via the communication module 518 (e.g., Bluetooth®) to the computing device 520 for display based on instructions from the software 514. The GPS module 508 may be configured to provide the GPS data by instructing the processor to send data communication to one or both of the WiFi module and cellular module for upload to the cloud and display via the website. The software 514 and the website may be further configured to overlay the GPS data onto a map, allowing the user to visualize the path the disc took during flight. The computing device 520 may be a frontend device or a user interface in this alternate configuration.

In an embodiment a disc throwing device (e.g., device 100 or device 400), a backend server or first computing device, and a second computing device (e.g., computing device 516) may form a system for measuring throwing disc throw data when the disc throwing device is connected to a disc (e.g., disc 200). The disc throwing device, the server, and the second computing device may be connected by a network and may be in network communication with each other. The server may have a processor, data storage, a memory, and backend software, the software providing instructions to the processor. The software may have instructions to perform calculations on data received from the disc throwing device and the software may provide a user interface such as, for example, a web interface or software interface through a display device. The server software may also be referred to as backend software. Data from the disc sports device from the first accelerometer, the gyroscope (e.g., the gyroscope and accelerometer device unit 302), the second accelerometer (e.g., offset accelerometer 304), the GPS module (e.g., the GPS unit and battery unit 312), may be processed by the PCBA processor and transmitted by the wireless communications module (e.g., the processor and communication unit 314) through the network to the first computing device and second computing device for display to a user.

While not an exhaustive list, the data collected, analyzed, and compared may include disc throw angle, disc flight angle, disc velocity, spin rate, disc throwing motion, throw initiation, pump fakes, flight dynamics (e.g., stability, wobble, etc.), and throw completion and disc flight path. The software 514 may be configured to collect and compare data and throwing metrics for other sports disc device users by communicating with software on other networked devices or by comparing data stored on a server. The software may include a comparison of thrower metrics to those of other users of the disc sports device based on various categories such as, for example, age, experience, gender, throwing hand. Categories common for disc golf may include data analysis such as, for example, the throw result (likely distance to a basket) between different discs used, throw type and the previously mentioned thrower categories.

Mobile app software 514 that is configured to receive sensor-based data metrics from the modular sensor-based disc sports device (e.g., disc sports device 100 or disc sports device 400) and visually output the metrics and other useful data analysis to help disc athletes improve and/or compare their disc throwing.

The software 514 and website may be designed and coded to provide functionality noted above, namely, to process raw data metrics provided by the sensors of the modular sensor-based disc sports device and to visually output (display) the resulting analysis and provide other useful feedback to the user on the computing device 520. In certain other embodiments, raw sensor data processing may be done by the processor 512 and selected output may be sent to the computing device 520 directly.

In certain embodiments the software 514 may be used to provide instructions to the PCBA 300 to adjust the operation and the data collected of the various sensors. For example, the power button 308 may be instructed to include additional functions by instructing multiple button presses to activate different functions. Examples of additional functions may include a device sleep/wake function, initiate a device pairing function with a mobile device or a first computing device, and/or to initiate a throwing session or round of disc golf.

In some embodiments, external sensors could be used in connection with the disc sports device 100. For instance, external sensors to track the location of the disc (known via GPS) with respect to the location of the thrower (with an external sensor, such as a GPS module) or the location of a particular body part of a thrower (i.e., arm, shoulders, hips, etc.). External sensors could be added to an Ultimate field or disc golf course to track disc location and player stats during games. Disc location may be tracked to find or locate discs to avoid losing them.

While generally considered to be an attachable/detachable device, in certain other embodiments, the disc sports device 100 of the present disclosure may optionally be integrated into a molded disc to reduce weight. The electronic components may be fully integrated into an injection molded disc. The result would be to reduce weight and improve durability.

Also, custom sports bags could be created for both Ultimate and Disc Golf to provide auxiliary functions to the disc sports device 100. These bags could charge the disc sports device 100 while holding the disc between throws and could hold a phone/camera in position to record a player's throwing form to better allow a player to gather both data and videos.

The disc sports device ((e.g., disc sports device 100 or disc sports device 400) of the present disclosure could be adapted by replacing the (non-centered) offset accelerometer 504 (304 on FIG. 19) with a centered gyroscope with a higher measurement range. However, having an offset accelerometer 504 provides highly valuable feedback by providing a larger measurement range and also may reduce component cost.

To use the disc sports device of the present disclosure, a user would attach the device to a disc of their choice. The user may then practice throwing the disc and view the resulting analysis of throwing metrics. Since the capturing and analysis of the raw data is performed in real time, the user may view the feedback on their own mobile device (e.g., computing device 520) while practicing throws. In certain embodiments, the mobile app (e.g., software 514) on the mobile device may also connect to a video device and capture videos of use practice throws, allowing for the display of disc throw metrics and other useful information alongside the video so that the user may review the metrics from the sensor and review videos captured using the mobile app. By looking at metrics and videos together, the user may identify opportunities for improvement and make adjustments. In some embodiments, the data captured by the sensors of the disc sports device 100 may be stored on cloud-accessible servers. In this way, different users who utilize the mobile app while throwing discs with the disc sports device attached may share their data metrics for comparison or for users to help each other. For instance, allowing a more experienced player to review novice player's metrics to provide coaching to the novice in order to speed up their development as a disc player.

The connector ring (e.g., connector ring 120 or connector ring 420 and second connector 440) are configured (e.g., shaped and dimensioned) to be placed on most standard throwing discs, golf discs, or discs such as those used in discuss throwing (e.g., disc 200). The connector ring is further configured to be centered on such throwing discs and is configured to attach the disc sports device (e.g., disc sports device 100 and disc sports device 400) so that the disc sports device is centered around the disc central axis 220. This provides for an attachable and detachable disc sports device, that may be attachable to a plurality of throwing discs, configured as described herein. Such a configuration of throwing disc, disc sports device, and connectors minimizes the imbalance on disc rotation due to having an attached device and minimizes the impact on user throwing disc throws. Such a configuration also serves to maximize disc throw characteristics measurement accuracy and data collection.

Some embodiments of the invention are described for a disc sports device (e.g., disc sports device 100 or disc sports device 400) that provides analysis of disc throws. In some embodiments, the modular sensor-based disc sports device may be attached to and used on any disc. In some embodiments, the modular sensor-based disc sports device may be transferred between different discs as needed. In some embodiments, the disc sports device is configured to provide data from the analysis of disc throws to a mobile app and a website. In some embodiments, the mobile app and the website provide disc athletes with visual access to their throw metrics. This allows disc athletes another way to improve their throwing skills.

While several aspects of the present invention have been described and depicted herein, alternative aspects may be affected by those skilled in the art to accomplish the same objectives. Accordingly, it is intended by the appended claims to cover all such alternative aspects as fall within the true spirit and scope of the invention.

What is claimed is:

1. A disc sports device for attachment to a throwing disc comprising:
    a circular housing, comprising:
        a first side opposite a second side connected by a sidewall therebetween, forming a cavity having a printed circuit board assembly ("PCBA") within, and
        a midline axis passing through the center of the first side, the center of the PCBA, and the center of the second side;
    the PCBA comprises:
        a processor, a memory, a first accelerometer centered on the midline axis, a second accelerometer offset from the first accelerometer, a magnetometer, a GPS module, a gyroscope, at least one wireless communication module, and a battery;
        the battery wired to provide power to the PCBA; and
        the processor in data communication with the memory, the first accelerometer, the gyroscope, the second accelerometer, the GPS module, the wireless communications module;
    a connecting ring comprising:
        a first connector side opposite a second connector side and a central opening therebetween, the first connector side having a disc connector and the second connector side having a housing connector detachably connected to the second side of the housing.

2. The disc sports device of claim 1, wherein second side has a circumferential lip, the connecting ring positioned within the circumferential lip and the central opening aligned with the midline axis.

3. The disc sports device of claim 1, wherein the second side extends beyond the sidewall forming a flanged ring.

4. The disc sports device of claim 1, wherein the disc sports device material is a flexible material.

5. The disc sports device of claim 4, wherein the disc sports device material is selected from a group consisting of: polyurethane, polyvinyl chloride, polyethylene, and polypropylene.

6. The disc sports device of claim 1, wherein the central opening is circular and configured to fit on the throwing disc around a disc center point, the connecting ring circumference equidistant from the central opening, and the connecting ring is centered on and attached to the throwing disc, to center and attach the disc sports device.

7. The disc sports device of claim 6, wherein the first connector side has an adhesive configured for attachment to the disc.

8. The disc sports device of claim 7, wherein the second side has an adhesive configured for connection to the second side of the housing.

9. The disc sports device of claim 8, wherein the disc sports device is centered on the disc, the midline axis aligned with the disc center point, when attached to the disc.

10. The disc sports device of claim 1, wherein second connector is a first part and the second side has a ringed second part of a two part connector.

11. The disc sports device of claim 10, wherein the two part connector is selected from a group consisting of: 3M Dual Lock™, hook and loop, and magnets.

12. The disc sports device of claim 1 wherein the at least one wireless communication module comprises, a Bluetooth® module and at least one device selected from a group consisting of: a Wi-Fi module, a Zigbee® module, a radio frequency transceiver, and a wireless telephone and data communication protocol module.

13. The disc sports device of claim 1 further comprising software operating on computing device, in network communication with the disc sports device.

14. The disc sports device of claim 1 wherein the connecting ring comprises an outer ring and an inner ring connected by a plurality of arms, the circular opening centered within the inner ring.

15. The disc sports device of claim 1 wherein the sidewall and the first side from a dome extending from the second side.

16. The disc sports device of claim 1 wherein the GPS module is configured to received data from a plurality of global positioning system sources.

17. A method for attaching and centering a disc sports device to a throwing disc comprising:
    centering a connector ring by aligning a central opening of the connector ring to a center point of a throwing disc;
    attaching a first connector side to the throwing disc;
    centering the disc sports device on the throwing disc by aligning a lip of the disc sports device with the circumference of the connector ring;
    attaching the disc sports device to the throwing disc by the connector ring; and
    thereby minimizing throwing imbalance and maximizing throwing data collection accuracy.

18. A method for attaching and centering a disc sports device to a plurality of throwing discs comprising:
    centering a connector ring by aligning a central opening of the connector ring to a center point of a first throwing disc;
    attaching a first connector side to the first throwing disc;
    centering the disc sports device on the first throwing disc by aligning a lip of the disc sports device with the circumference of the connector ring;
    aligning a first mating part on the disc sports device to a second mating part of the connector ring of a two part mating connector;
    attaching disc sports device to the first throwing disc by the connector ring; and
    thereby minimizing throwing imbalance and maximizing throwing data collection accuracy when throwing the first throwing disc;
    centering a second connector ring by aligning a central opening of the second connector ring to a center point of a second throwing disc;
    attaching a first connector side of the second connector ring to the second throwing disc;
    removing the disc sports device from the first throwing disc by detaching the mating part of the disc sports device;

centering the disc sports device on the second throwing disc by aligning a lip of the disc sports device with the circumference of the second connector ring;

aligning the first mating part on the disc sports device to a second mating part of the second connector ring;

attaching the second connector ring to the disc sports device; and thereby minimizing throwing imbalance and maximizing throwing data collection accuracy when throwing the second throwing disc.

19. A system for measuring throwing disc throw data comprising:

a disc sports device having a circular housing, comprising:

a first side opposite a second side connected by a sidewall therebetween, forming a cavity having a printed circuit board assembly ("PCBA"), and a midline axis passing through the center of the first side, the center of the PCBA, and the center of the second side;

the PCBA comprises:

a processor, a memory, a first accelerometer centered on the midline axis, a second accelerometer offset from the first accelerometer, a magnetometer, a GPS module, a gyroscope, and at least one wireless communication module, and a battery;

the battery wired to provide power to the PCBA; and the processor in data communication with the memory, the first accelerometer, the gyroscope, the second accelerometer, the GPS module, the wireless communications module;

a connecting ring comprising:

a first connector side opposite a second connector side and a central opening therebetween, the first connector side having a disc connector and the second connector side having a housing connector detachably connected to the second side of the housing, and the first side connected to and centered on a throwing disc;

a network;

a first computing device comprising:

a processor, data storage, a memory, and backend software, the software providing instructions to the processor;

a second computing device comprising:

a processor, data storage, a memory, and frontend software, the software providing instructions to the processor;

wherein the disc sports device, the first computing device, and the second computing device are in network communication and data from the disc sports device from the first accelerometer, the gyroscope, the second accelerometer, the GPS module, is processed by the PCBA processor and transmitted by the wireless communications module through the network to the first computing device and second computing device for display to a user.

* * * * *